(12) United States Patent
Harvill et al.

(10) Patent No.: US 8,401,916 B2
(45) Date of Patent: Mar. 19, 2013

(54) PRODUCT CUSTOMIZATION SYSTEM AND METHOD

(75) Inventors: Leslie Young Harvill, Half Moon Bay, CA (US); Robert Irven Beaver, III, San Francisco, CA (US); Eric Dean Matson, Dublin, CA (US); E. Paul Salcedo, Santa Clara, CA (US); Eddie Nelson Caggiani, San Jose, CA (US)

(73) Assignee: Zazzle Inc., Redwood City, CA (US)

( * ) Notice: Subject to any disclaimer, the term of this patent is extended or adjusted under 35 U.S.C. 154(b) by 0 days.

(21) Appl. No.: 13/464,874

(22) Filed: May 4, 2012

(65) Prior Publication Data

US 2012/0221428 A1     Aug. 30, 2012

Related U.S. Application Data

(63) Continuation of application No. 12/511,910, filed on Jul. 29, 2009, now Pat. No. 8,175,931.

(60) Provisional application No. 61/084,576, filed on Jul. 29, 2008.

(51) Int. Cl.
*G06Q 30/00* (2006.01)
(52) U.S. Cl. ...................................................... 705/26.1
(58) Field of Classification Search .................. 705/26.1
See application file for complete search history.

(56) References Cited

U.S. PATENT DOCUMENTS

| | | | |
|---|---|---|---|
| 5,850,222 A | 12/1998 | Cone | |
| 6,173,211 B1 | 1/2001 | Williams et al. | |
| 6,196,146 B1 | 3/2001 | Goldberg et al. | |
| 6,280,891 B2 | 8/2001 | Daniel | |
| 6,310,627 B1 | 10/2001 | Sakaguchi | |
| 6,473,671 B1 | 10/2002 | Yan | |
| 6,546,309 B1 | 4/2003 | Gazzuolo | |
| 6,564,118 B1 | 5/2003 | Swab | |
| 6,804,573 B2 | 10/2004 | Goldman | |
| 6,842,532 B2 | 1/2005 | Hu et al. | |
| 6,907,310 B2 | 6/2005 | Gardner et al. | |
| 6,947,808 B2 | 9/2005 | Goldman | |
| 6,968,075 B1 | 11/2005 | Chang | |
| 7,016,756 B2 | 3/2006 | Goldman | |
| 7,016,757 B2 | 3/2006 | Goldman | |
| 7,216,092 B1 | 5/2007 | Weber et al. | |
| 7,409,259 B2 | 8/2008 | Reyes Moreno | |
| 7,479,956 B2 | 1/2009 | Shaw-Weeks | |
| 2001/0026272 A1 | 10/2001 | Feid et al. | |
| 2002/0099524 A1 | 7/2002 | Sell et al. | |
| 2003/0076318 A1 | 4/2003 | Shaw-Weeks | |
| 2003/0120183 A1 | 6/2003 | Simmons | |
| 2003/0168148 A1 | 9/2003 | Gerber et al. | |
| 2003/0182402 A1 | 9/2003 | Goodman et al. | |
| 2003/0184544 A1 | 10/2003 | Prudent | |
| 2004/0078285 A1 | 4/2004 | Buvoet | |
| 2004/0194344 A1 | 10/2004 | Tadin | |

(Continued)

FOREIGN PATENT DOCUMENTS

EP     1136899     9/2001

OTHER PUBLICATIONS

PCT/US08/81215 International Search Report dated Jan. 5, 2009, 2 pages.

(Continued)

*Primary Examiner* — Mila Airapetian
(74) *Attorney, Agent, or Firm* — DLA Piper LLP (US)

(57) ABSTRACT

A product customization system and method are provided in which a consumer can insert user content, such as images or text, onto a product, such as a shoe, and then view the customized product before purchasing the customized product.

11 Claims, 24 Drawing Sheets

U.S. PATENT DOCUMENTS

| | | | |
|---|---|---|---|
| 2004/0227752 | A1 | 11/2004 | McCartha et al. |
| 2004/0236634 | A1 | 11/2004 | Ruuttu |
| 2005/0131571 | A1 | 6/2005 | Costin |
| 2005/0177453 | A1 | 8/2005 | Anton et al. |
| 2005/0238251 | A1 | 10/2005 | Lunetta et al. |
| 2006/0015207 | A1 * | 1/2006 | Weiser et al. ............... 700/132 |
| 2006/0020486 | A1 | 1/2006 | Kurzweil et al. |
| 2007/0083383 | A1 | 4/2007 | Van Bael et al. |
| 2007/0208633 | A1 | 9/2007 | Singh |
| 2008/0079727 | A1 | 4/2008 | Goldman et al. |
| 2009/0070666 | A1 | 3/2009 | Eilers et al. |
| 2009/0122329 | A1 | 5/2009 | Hegemier et al. |
| 2009/0190858 | A1 | 7/2009 | Moody et al. |
| 2009/0254207 | A1 | 10/2009 | Tiffany et al. |
| 2010/0169185 | A1 | 7/2010 | Cottingham |

OTHER PUBLICATIONS

PCT/US08/81215 Written Opinion dated Jan. 5, 2009, 6 pages.
PCT/US09/61858 International Search Report dated Dec. 18, 2009, 4 pages.
PCT/US09/61858 Written Opinion dated Dec. 18, 2009, 5 pages.
PCT/US09/54806 International Search Report dated Oct. 7, 2009, 3 pages.
PCT/US09/54806 Written Opinion dated Oct. 7, 2009, 6 pages.
PCT/US09/52154 International Search Report dated Sep. 23, 2009, 3 pages.
PCT/US09/52154 Written Opinion dated Sep. 23, 2009, 6 pages.
EP Application No. 08843251.3 Supplemental Search Report dated Nov. 23, 2010, 11 pages.
EP Application No. 09822776.2 Supplemental Search Report dated Mar. 2, 2012, 9 pages.
Demarco "Zazzle and Pitney Bowes Team up to deliver custom stamps to consumers," (2005), published online: http//www.zazzle.com/mk/welcome/pressreleases/pr071805_2 (2 pages).
Ehara J et al: "Texture overlay onto deformable surface for virtual clothing" ACM International Conference Proceeding Series—Proceedings of the 2005 International Conference on Augmented Tele-Existence, ICAT '05 2005 Association for Computing Machinery USA, vol. 157, 2005 , pp. 172-179, XP002606672 Do!: DOI:10.1145/1152399.1152431 (8 pages).
Ehara J et al: "Texture overlay for virtual clothing based on PCA of silhouettes" Mixed and Augmented Reality, 2006. ISMAR 2006. IEEE/ACM International Symposium on, IEEE, PI, Oct. 1, 2006, pp. 139-142, XP031014661 ISBN: 978-1-4244-0650-0 (4 pages).
Meseth "Towards Predictive Rendering in Virtual Reality" Ph.D. dissertation, Bonn University, published Oct. 2006 (369 pages).
Nelson, J "From Moon Shoes to Gel Gun—Sustaining Hart health", Columbian. Vancouver, Wash.: Oct. 11, 2007 (3 pages).
Scholz V et al: "Garment motion capture using color-coded patterns" Computer Graphics Forum Blackwell Publishers for Eurographics Assoc UK, vol. 24, No. 3, 2005 , pp. 439-439, XP002603022 ISSN: 0167-7055 (9 pages).

\* cited by examiner

PRODUCT CUSTOMIZATION SYSTEM AND METHOD

PRIORITY CLAIMS/RELATED APPLICATIONS

This application is a continuation of and claims priority under 35 USC 120 to U.S. patent application Ser. No. 12/511,910, filed on Jul. 29, 2009 and entitled "PRODUCT CUSTOMIZATION SYSTEM AND METHOD" (to be issued on May 8, 2012 as U.S. Pat. No. 8,175,931) which in turn claims the benefit under 35 USC 119(e) and priority under 35 USC 120 to U.S. Provisional Patent Application Ser. No. 61/084,576, filed on Jul. 29, 2008 and entitled "Product Customization System and Method", the entirety of both of which are incorporated herein by reference.

APPENDIX A

Appendix A (2 pages) contains pseudocode for a mesh detection method that is part of the product customization unit. Appendix A is incorporated herein by reference and forms part of this specification.

FIELD

The system relates to a product customizing system and method.

BACKGROUND

Systems exist that allow a user to customize a piece of clothing. For example, Nike® and Converse® and the like have systems that allow a consumer to customize a piece of clothing, such as running shoes or other shoes. For example, the Nike® system can be found at http://nikeid.nike.com/. While these sites allow some customization of the shoes (changing the colors of various portions of the shoes), these existing sites do not allow a consumer to provide user content that could be placed on the outside of the shoe. In addition, these existing systems do not allow the consumer to see the customized shoes (with the user content). Thus, it is desirable to provide a customized product system and method that allows a consumer to provide user content and it is to this end that the system and method are directed.

DETAILED DESCRIPTION OF ONE OR MORE EMBODIMENTS

The system and method are particularly applicable to web-based client/server architecture system for a shoe customization system and method implemented in software on a computer as described below and it is in this context that the system and method will be described. It will be appreciated, however, that the system and method can be used to customize any product in which it would be desirable to allow a consumer/user to insert user content onto a product that can be manufactured by the system. In addition, the system and method can be implemented in software (shown in the illustrated implementation), hardware or a combination of hardware and software and may also be implemented on client/server system (shown in the illustrated implementation), a web server, a terminal, a peer to peer system and the like so that the system and method are not limited to the particular implementation of the system or method.

Figure 1A:
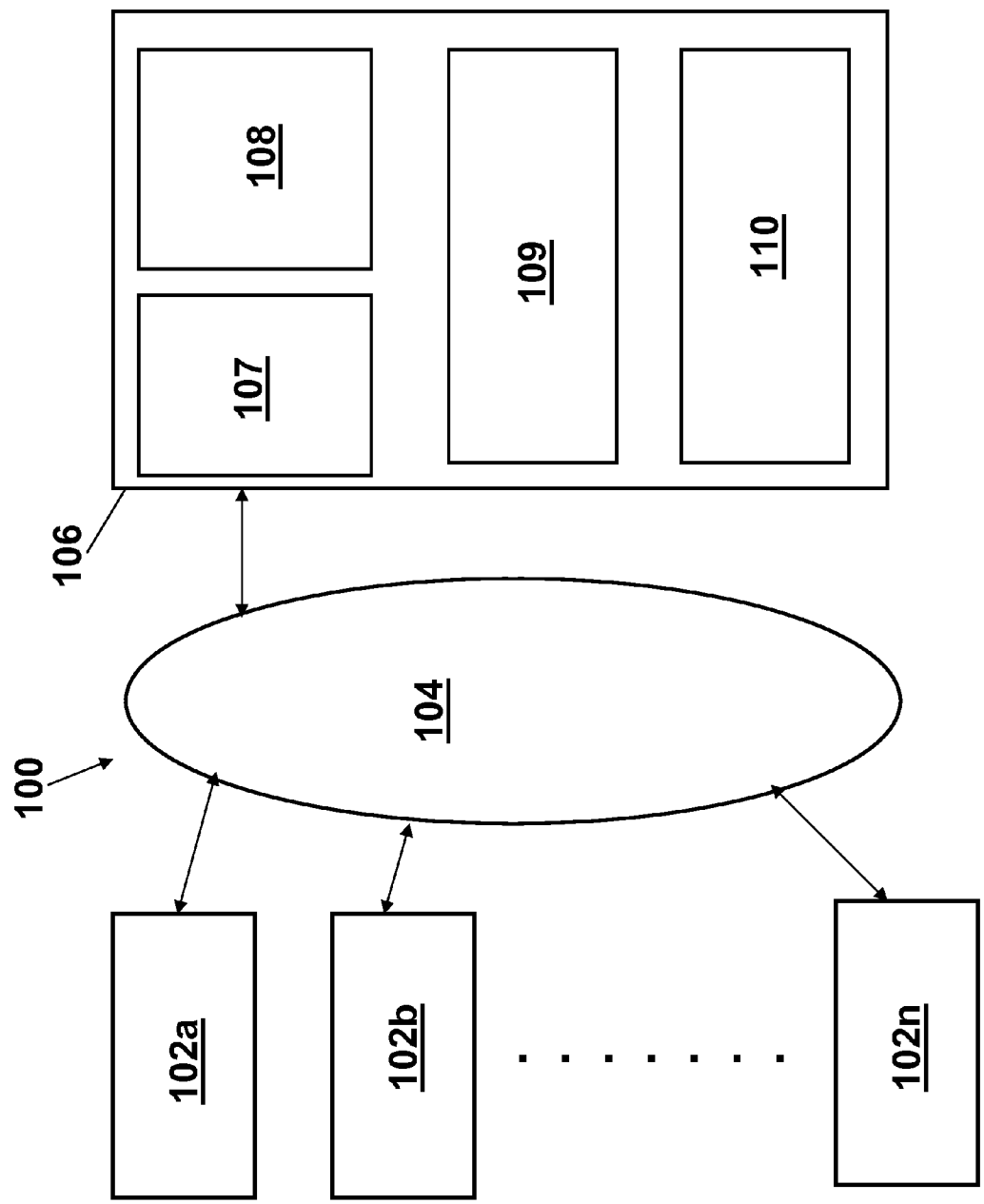
FIG. 1A illustrates an example of an embodiment of a product customization system.

FIG. 1A illustrates an example of an implementation of a product customization system 100. The system may include one or more consumer computing devices 102, (such as 102a, 102b, . . . , 102n) wherein each computing device has at least one processing unit, memory, some persistent memory, some other memory, a display device and input/output devices (and each may be a personal computer, mobile device, cellular device, wireless email device, converged device such as a Treo or Blackberry and the like) that permit the consumer to interact with the consumer computing device as well as the system through an application, such as for example a known browser application, being executed by the consumer computing device. Each consumer computing device may establish a connection with and communicate over a link 104 using a typical secure or unsecure protocol with a product customization unit 106. The link 104 may be implemented using a computer network, a cellular network, a wired or wireless link and the like. In one embodiment, the link is the Internet. The product customization unit 106 may be implemented in hardware, software or a combination of hardware and software. In one embodiment, the product customization unit 106 may be one or more server computers that execute a plurality of lines of computer code to perform the functions and operations of the product customization unit 106 as described below.

In one illustrative embodiment, the product customization unit 106 may further comprise at least one web server 107 (implemented in hardware or software or a combination of the two) that establishes a connection with each consumer computer device, receives requests from each consumer computer device and communicates data and information (such as by using one or more web pages) and requests for consumer computer device information to each consumer computer device wherein the consumer computer device interacts with the web server using a known secure or unsecure protocol and a typical browser application. At least one web server, for example, may serve a web page that allows the consumer to browse the available products and designs and then, using the product customization system, customize the particular design of a particular product using user content. The product customization unit may further include a store 108 that contains and stores the relevant information for the product customization unit including the product information and images for the web pages, customization data, etc. The product customization unit may further comprise a product customizer 109 (that may be implemented as a plurality of lines of computer code wherein the plurality of lines of computer code are executed by the processing unit(s) of the server computers to implement the product customization system) that allows a consumer to customize a product, allows a consumer to upload user content (images and/or text), and allows the consumer to place the user content on the product, allows the consumer to view the customized product for all angles, and allows the consumer to customize various features of the product, etc. as described below in more detail. The product customization unit may further comprise a well known ecommerce engine 110 that, once the consumer has customized a product with particular user content, may allow the consumer to purchase the customized product. In one implementation, the product customization system may also be part of a larger web site/system such as, for example, www.zazzle.com.

For purposes of illustrating the product customization system and method, a product customization method and user interface for a piece of footwear, such as a shoe, upon which user content is placed is described below. However, the product customization system may also be used for other products, such as other apparel and other products in which it is desirable to provide a consumer with the ability to customize the product with user content.

Figure 1B:
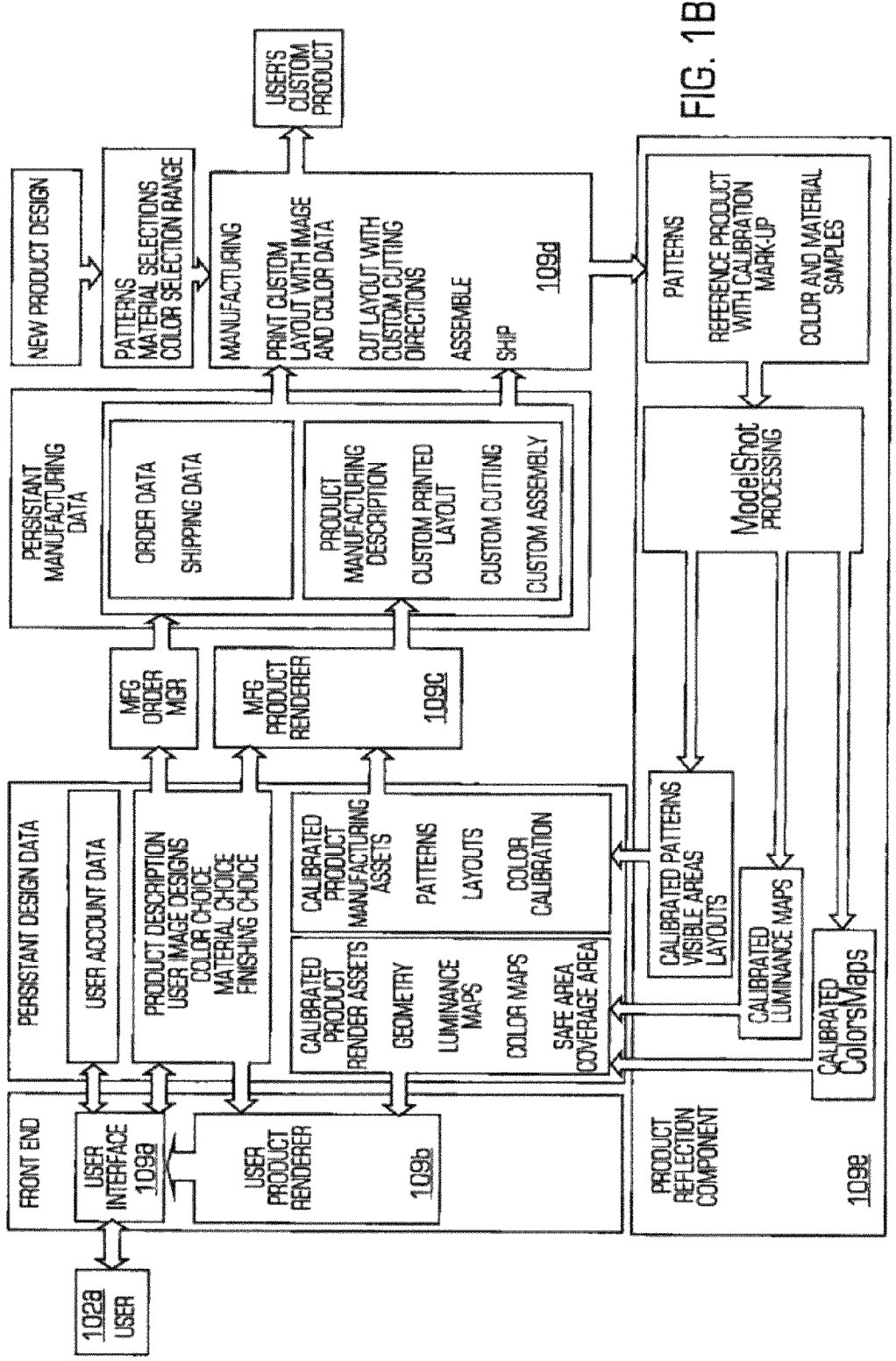
FIG. 1B illustrates more details of the product customization unit that is part of the product customization system.

FIG. 1B illustrates more details of the product customization unit 109 that is part of the product customization system. In particular, the product customization unit may further comprises a user interface portion 109a, a user product renderer portion 109b, a manufacturing product renderer portion 109c, a manufacturing portion 109d and a reflection portion 109e. In one implementation, each of these portions may be implemented using a combination of hardware and software. Each of these portions of the product customization unit 109 are described in further detail with reference to FIG. 1C. FIG. 1B also illustrates the various data that is associated with the product customization unit that may be stored in a store that may be, in one embodiment, a software based database. The data includes persistent design data, persistent manufacturing data and the like as shown.

Figure 1C:
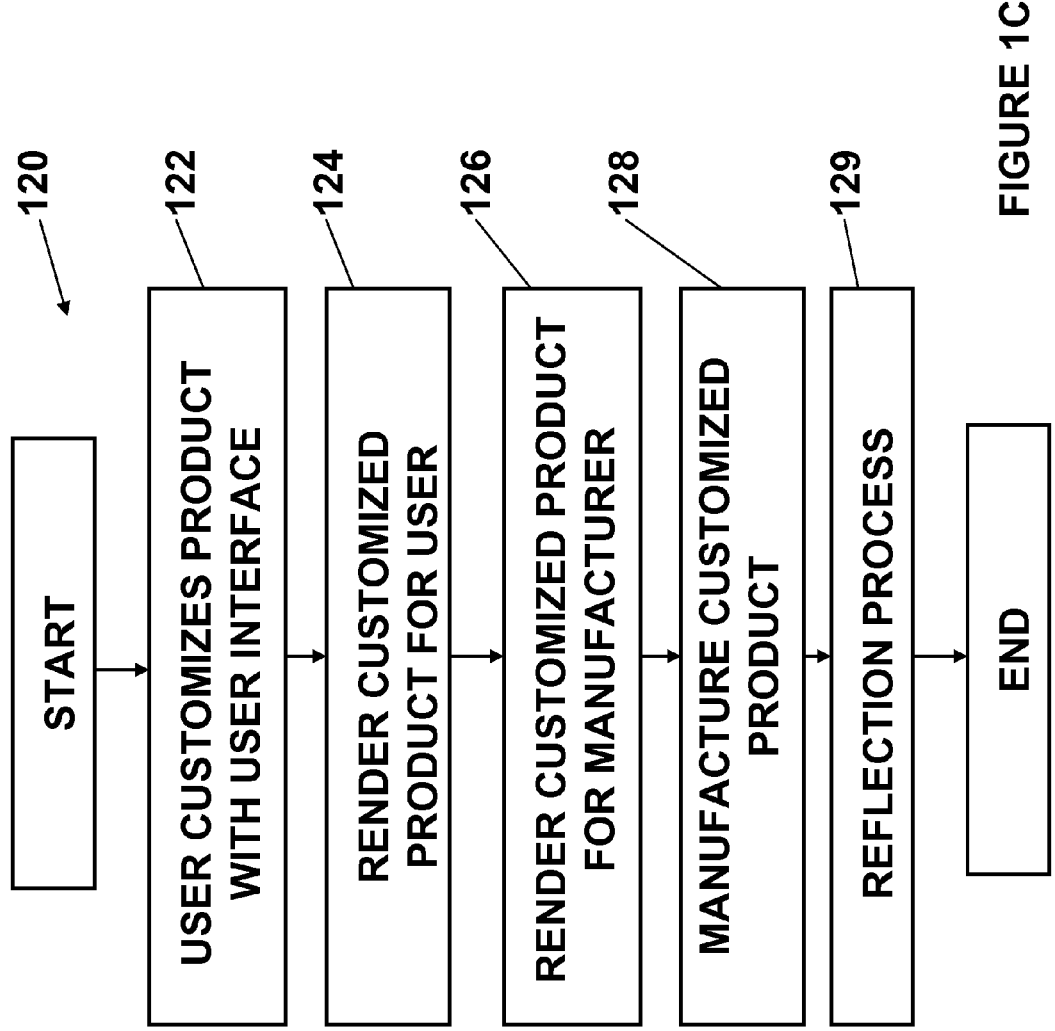
FIG. 1C illustrates an implementation of a method for product customization.

FIG. 1C illustrates an implementation of a method 120 for product customization that may be implemented, for example, by the product customization system shown in FIG. 1A. The method allows the manufacture of user designed products and the method applies user created colors and designs to a product made out of flat pattern pieces of fabric and sewn together in one embodiment.

The product customization system permits a user/consumer to customize a product using the user interface portion 109a (122) that may be implemented as one more web pages in one embodiment. The user interface portion 109a allows the user to interactively apply colors, tiled images, and photographic or designed images (user designed images) to a two dimensional pattern pieces that comprise the product as described below in more detail. As shown in FIG. 1B, the data generated by the user interface portion may include user account data, a product description (that describes the user's custom product), user image designs (that contains the user content), color choice (the color(s) chosen by the user), material choice (the type of material for the custom product) and the finishing choice (the finishing selected by the user for the custom product). The user interface portion assembles a set of instruction that describe the user design and requests images of the final product from the user product renderer portion 109b. The resulting interaction is performed in real time, in that the edit, request, design cycle may be performed in 250 milliseconds.

The product customization system then renders the customized product for the user/consumer (124) using the user product renderer portion 109b. The user product renderer portion takes the data/information/description of the two dimensional pattern pieces (based on the user interactions with the user interface portion) and other user preferences and using information supplied by the reflection portion 109e, synthesizes an image of the final cut and sewn manufactured product that is then displayed to the user/consumer. As shown in FIG. 1B, the reflection portion 109e (which provides feedback throughout the product customization unit) generates calibrated color maps and calibrated luminance maps to the calibrated product render assets (including geometry, luminance maps, color maps and safe area coverage maps) that are used to generate the images for the product. The product customization system then renders the customized product for the manufacturer (126) using the manufacturing product renderer portion 109c. The manufacturing product renderer portion receives the data/information/description of the two dimensional pattern pieces, other user preferences and information supplied by the reflection portion 109e and prepares Image Pattern Files, Cutting Files, and Operator directions used by the manufacturing portion 109d.

The product customization system then manufactures the customized product (128) using the manufacturing portion 109d. The manufacturing portion performs, for example, the following processes: 1) manufactures the flat pattern pieces using the Image Pattern Files and Cutting Files; 2) sews the pattern pieces based on the Operator directions; 3) performs finishing steps; 4) ships the product based on the Operator directions; and/or 5) gathers product information for the Reflection portion (including patterns, reference product with calibration mark-up and/or color and material samples) that are input to a modelshot processing component that performs various modelshot processing tasks as described in more detail in U.S. patent application Ser. No. 11/925,716 filed on Oct. 26, 2007 entitled "Product Modeling System and Method" which is incorporated herein by reference. An example of a mesh detection method that may be used in the modelshot processing is attached as Appendix A which is incorporated herein and forms part of the specification.

The product customization system then performs the reflection process (129) using the reflection portion 109e which is a portion of the system that provides feedback to the other portions of the systems. For example, the reflection portion may performs the following tasks: 1) provides updated product patterns to the manufacturing product renderer portion (the calibrated patterns and visible area layouts as shown in FIG. 1B); 2) manufactures reference product used by the user product renderer portion (the calibrated patterns and visible area layouts as shown in FIG. 1B); 3) calibrates pattern position with the manufactures reference product; 4) provides calibrated photographic references of reference product to the user product renderer portion; and/or 5) provides calibrated reflectance and color mapping for the user product renderer portion (the calibrated color maps and calibrated luminance maps as shown in FIG. 1B).

User Product Renderer Portion Asset/Data Flow

The flow of assets/data in the user product renderer portion are now described in more detail. In particular, the manufacture portion 109d as shown in FIG. 1B may manufacture a reference product with printed marker pattern, and color-marked pattern regions using the same pattern and manufacturing techniques that will be used for the finished product which are forwarded to the reflectance portion 109e.

The reflectance portion performs a recording process, a detection process, a retouch process and a build runtime assets process to generate data and information that is forwarded onto the user product renderer. During the recording process, the reference product is photographed, or recorded in a predetermined set of views and environments as described more fully in U.S. patent application Ser. No. 11/925,716 filed on Oct. 26, 2007 entitled "Product Modeling System and Method" which is incorporated herein by reference. Once the recording process is completed, the detection process (also described in more detail on U.S. patent application Ser. No. 11/925,716 filed on Oct. 26, 2007 entitled "Product Modeling System and Method") occurs in which the following processes are performed: 1) detection of the pattern regions by color differences of the reference product; 2) detection of the marker pattern by frequency (bandpass) and color differences (see code in Appendix A); 3) mapping the detected marker pattern to the printed marker pattern using polygon adjacency (see code in Appendix A); 4) remove markers with Image Synthesis; and 5) remove Color differences using calibrated color data; 6) produce a set of artist-editable images for retouch wherein the images contain: a) a mesh for each pattern area which maps from the image space to the cut pattern space; b) a channel of visibility for each pattern; and c) a channel of visibility for each additional color or texture area.

During the re-touch process, the images generated by the detection process are reviewed and re-touched with respect to mesh alignment and the visibility channels. The reflection portion then generates the build runtime data that includes geometry and image data. It also creates a geometry for color regions, if needed, for Color and Material regions and subdivides each pattern grid into polygons, and culls each polygon by visibility in final image and output a Geometry File. The image data may convert the RGB data into luminance data; normalize visibility data for each pixel (which removes the need to clip data at runtime), pre-multiply luminance and visibility data (which replaces an Alpha Composite with an Add at runtime) and output all combined Luminance-Visibility channels as a compressed Luminance Map.

The user product renderer loads the product description and renders the image. During the loading of the product description, the user product renderer loads user images, selected tiled images for fills, color selections, material selections, geometry for style, size, view and/or luminance maps. When rendering the product image, the user product renderer renders a Black region for product area and, for each region in the Geometry file either: 1) if it is a pattern, sample the texture image and add the sample to the output image; or 2) if it is a color or material region, look up the color value from calibrated color reflectance map and add the value to the output image.

Manufacturing Product Rendering Asset/Data Flow

The flow of assets/data in the manufacturing product renderer portion are now described in more detail. The manufacturing product renderer portion may perform product design, manufacturing and receive feedback from the reflectance portion. During an initial product design, the manufacturing product renderer portion designs a print, cut and sew product which may include designing Cut Patterns, marking initial visible areas and noting grading rules for sizing. The manufacturing product renderer portion may also provide Print Files, Patterns, Sketches and Notes to Manufacturing Sample room, iterate on the product and repeat the repeat the design-Prototype process until design is complete.

For the manufacturing, the manufacturing product renderer portion may manufacture a Design Prototype (including a Prototype Printing Process, a Prototype Cut Process and a Prototype Sew Process) and provide a sample to Product Design. For product design, the manufacturing product renderer portion may grade samples (such as apply Grading Rules and produce a full Pattern Set and apply initial Visibility lines (provide full pattern set with visibility to Manufacturing and provide images for images for printing each pattern with a region color and marker grids). For manufacturing, the manufacturing product renderer portion may manufacture test reference set of product with region colors and markers.

The reflectance portion has an imaging portion (such as a camera) that photographs reference product, detect color regions and markers, refine visibility pattern regions (such as map visibility from photograph to pattern space, refine visibility regions, build tolerance data for print visibility (safe areas for print and maximum areas for print) and update patterns with visibility regions, builds layouts (including, for each pattern size, and style, building a layout template (with the maximum print and cut area for each pattern element for product, automatic positioning of pattern elements and review and correction of the pattern layout), and building pattern assets (such as cutting patterns, print regions, layout placements (product style and product size with cutlines, maximum print area and pattern annotations), and/or visibility regions (Border Patrol) for UI Interface (with safe areas and max print area.

The reflectance portion may require that multiple photographs be taken of a single object, with one camera, and one view, but with a specific lighting sequence. For example, this lighting sequence may include a back lit, or silhouette lighting for an image of the object, a diffuse front fill light image of the object, and additional sequences of directional or key lights for images of the object. The silhouette image of the object may be used to separate the object from its background, the fill image may be used for better automatic recognition of mark-up printed or applied to the object, and the key lights may be used to supply texture and surface detail present on the object.

The manufacturing product rendering portion can then pull the user product description from persistent storage, pull the pattern set for the particular product style and size, create the layout (including placing cutlines, placing print areas (mask by Max Print Area) (with user selected background colors, user images and user selected tiled image elements), place pattern annotations, provide data to manufacturing (the custom pattern layout and operator instructions with visual product reference) and the manufacture the product by printing the custom layout from provided data and cutting the custom layout from provided data. Now, the user interface portion of the product customization unit will be described in more detail.

Figure 2:
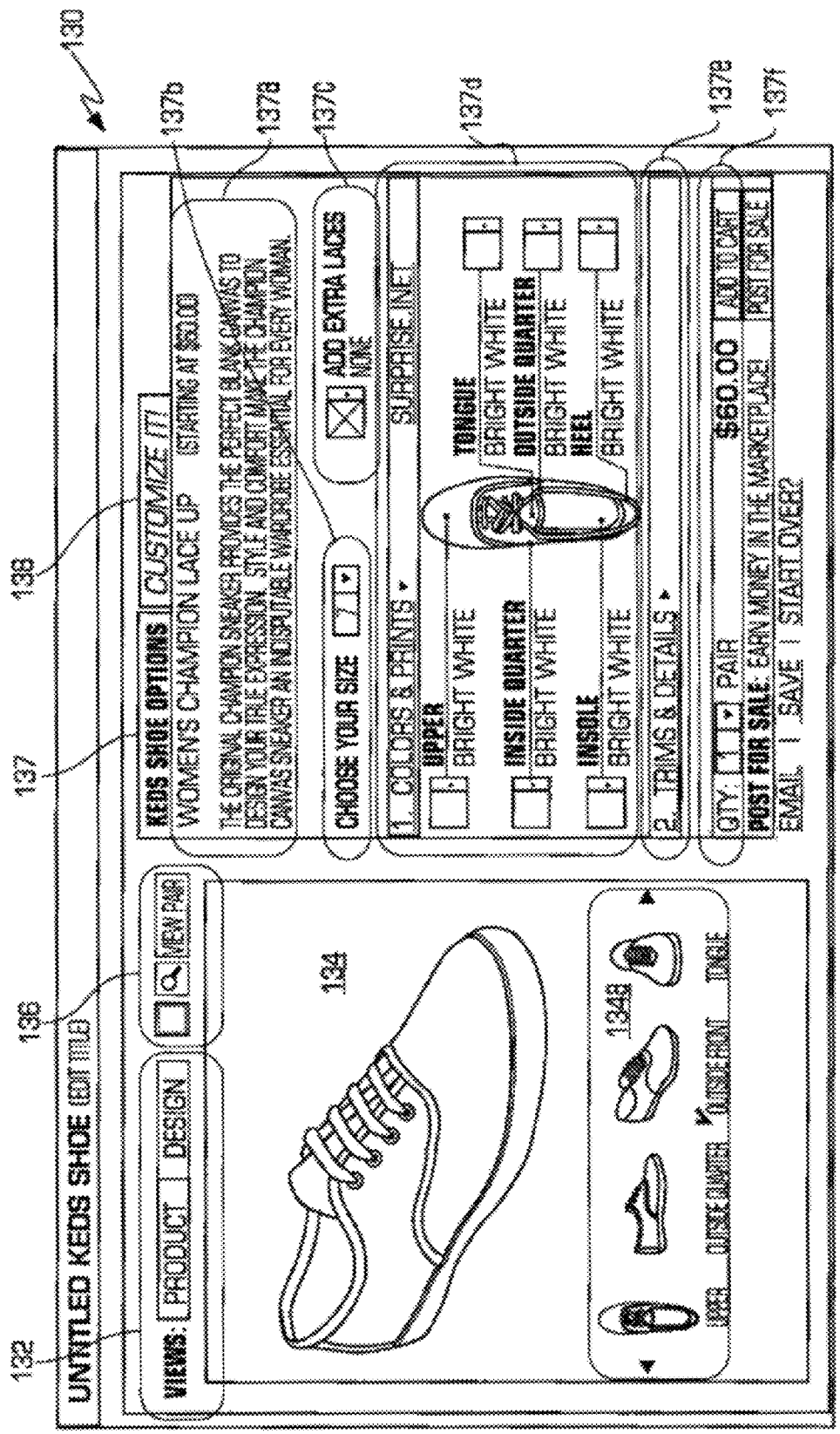
FIG. 2 illustrates an example of a user interface of the product customization system.
Figure 12A:
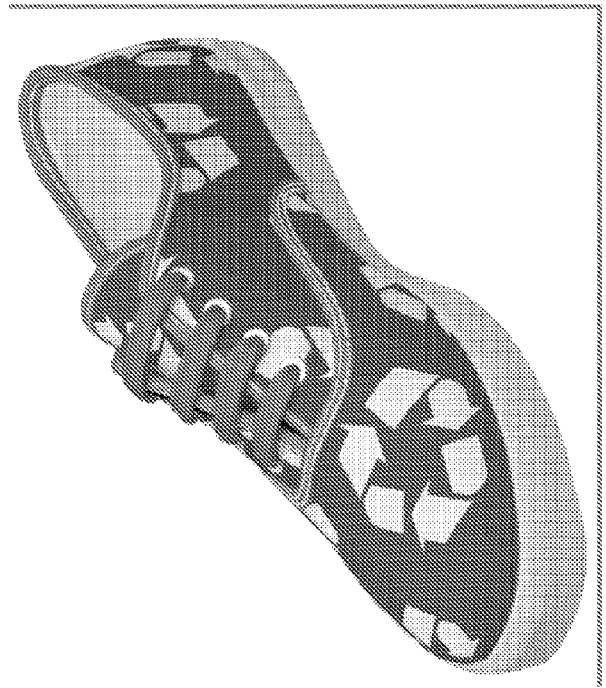
FIGS. 12A and 12B illustrate two customized product preview user interface of the product customization system.
Figure 12B:

FIG. 2 illustrates an example of a user interface 130 of the product customization system. The user interface may include a view option portion 132 that allows the user/consumer to select between a product view as shown in FIG. 6 (the product image with or without the user content shown) or a design view as shown in FIG. 5 (the pieces of product on which the user/consumer can place the user content) in a view portion 134. The view portion also has a view selector 134a that allows the user/consumer to select among the views (upper, outside quarter, outside front or tongue for example) to be displayed in the view portion. The user interface may also include a view tools portion 136 that allows the user to replace or delete a portion of the view (dotted box tool), zoom the view (the magnifying glass tool) and/or view the pair of products (such as shown in FIG. 12B with user content) together in the view portion.

The user interface further comprises a product options tab 137 (a Keds Shoe option tab because the product in the example is a Keds shoe) that allows the user to select various product options (such as colors and patterns for the design area and for accessories) and a customize it tab 138 (shown in more detail in FIG. 6) that allows the user to customize the product with user content as described below in more detail. As shown, the product options tab (for the example in which the product is a shoe) may further include a product summary portion 137a that displays a summary of the particular product, a size portion 137b that allows the user to select the appropriate size of the product, an extra laces portion 137c that allows the user to select extra laces to be purchased with the customized product, a color and prints portion 137d that allows the user to select a color and/or print for each piece of the product (such as the upper, tongue, inside quarter, insole, heel and outside quarter in the shoe example), a trims and detail user interface 137e (shown in more detail in FIG. 4) that allows the user to select certain trims and details for the product and a commerce portion 137f that allows the user to select a quantity of products to purchase, shows the accumulated price of the products and allows the user to add the customized products to an electronic shopping cart.

Figure 3:
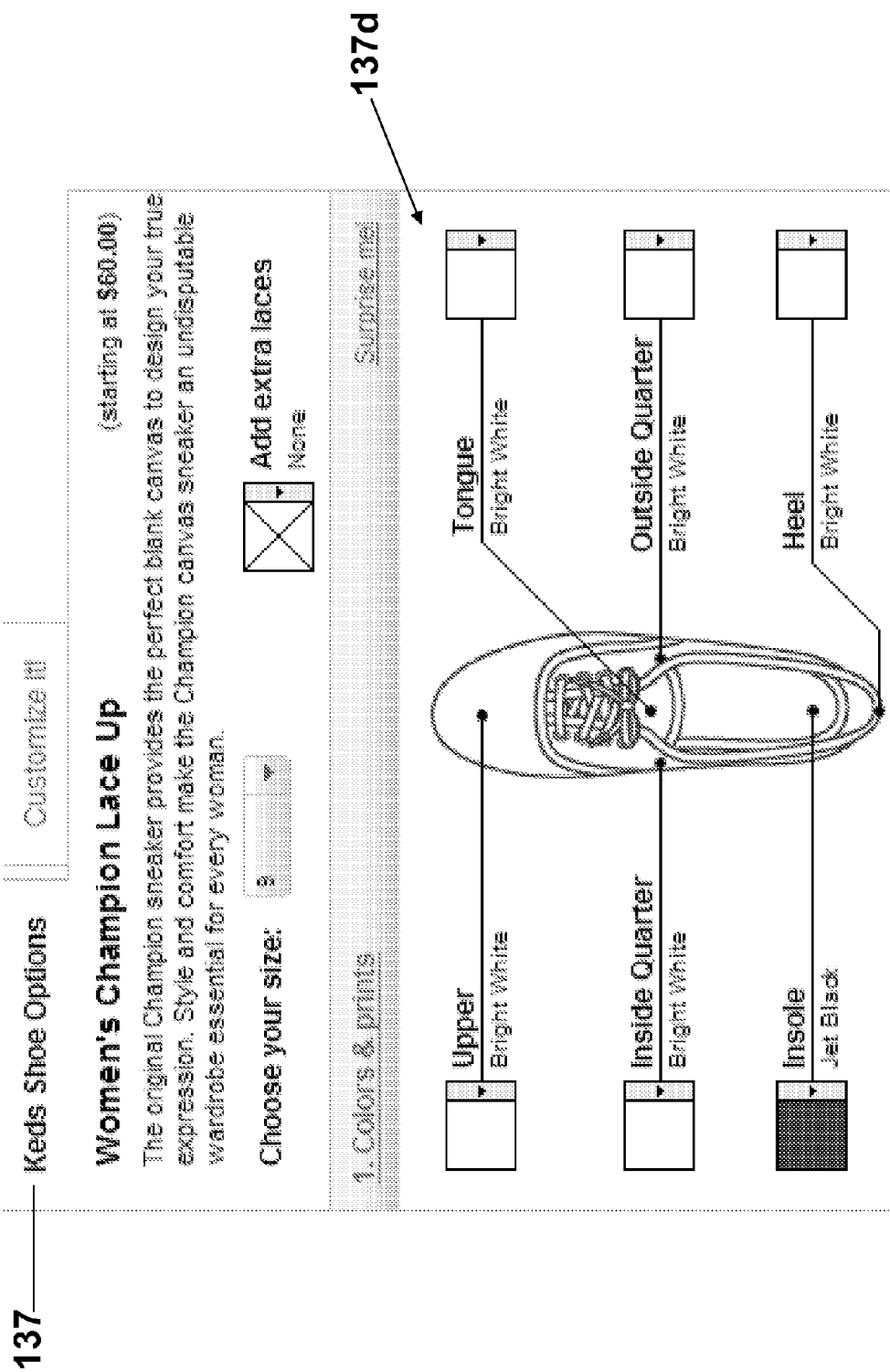
FIG. 3 illustrates further details of the shoe options user interfaces of the product customization system.

FIG. 3 illustrates further details of the shoe options user interface 137 of the product customization system and in particular the color and prints portion 137d is shown in which, in one example, at least one design area of the product (the insole design area of a shoe) has a jet black color while the other design areas of the products (design areas of the shoe in the example shown) are bright white. This portion of the user interface allows the user/consumer to select different colors or predetermined patterns to add to none, any or all of the portions of the product. Once a color and/or pattern is selected for a particular design area of the product, the color or pattern will appear on the product in the viewing area on the left of the screen as shown in FIG. 2.

Figure 4:
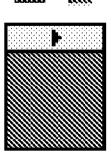
FIG. 4 illustrates a trim and details user interface of the product customization system.

FIG. 4 illustrates a trim and details user interface 137e of the product customization system. As shown, this user interface allows the user to change various trim and details of the product including colors and/or patterns. In the example in which the product is a shoe, the trim and details of the product may include the lace colors, the eyelet colors, the stitching colors, the lining colors, the midsole colors, the upper binding colors, the top binding colors, the tongue binding colors and the insole binding colors as shown in FIG. 4. For a different product, the particular trim and details shown in FIG. 4 would be different as would be well understood by one skilled in the art.

Figure 5A:
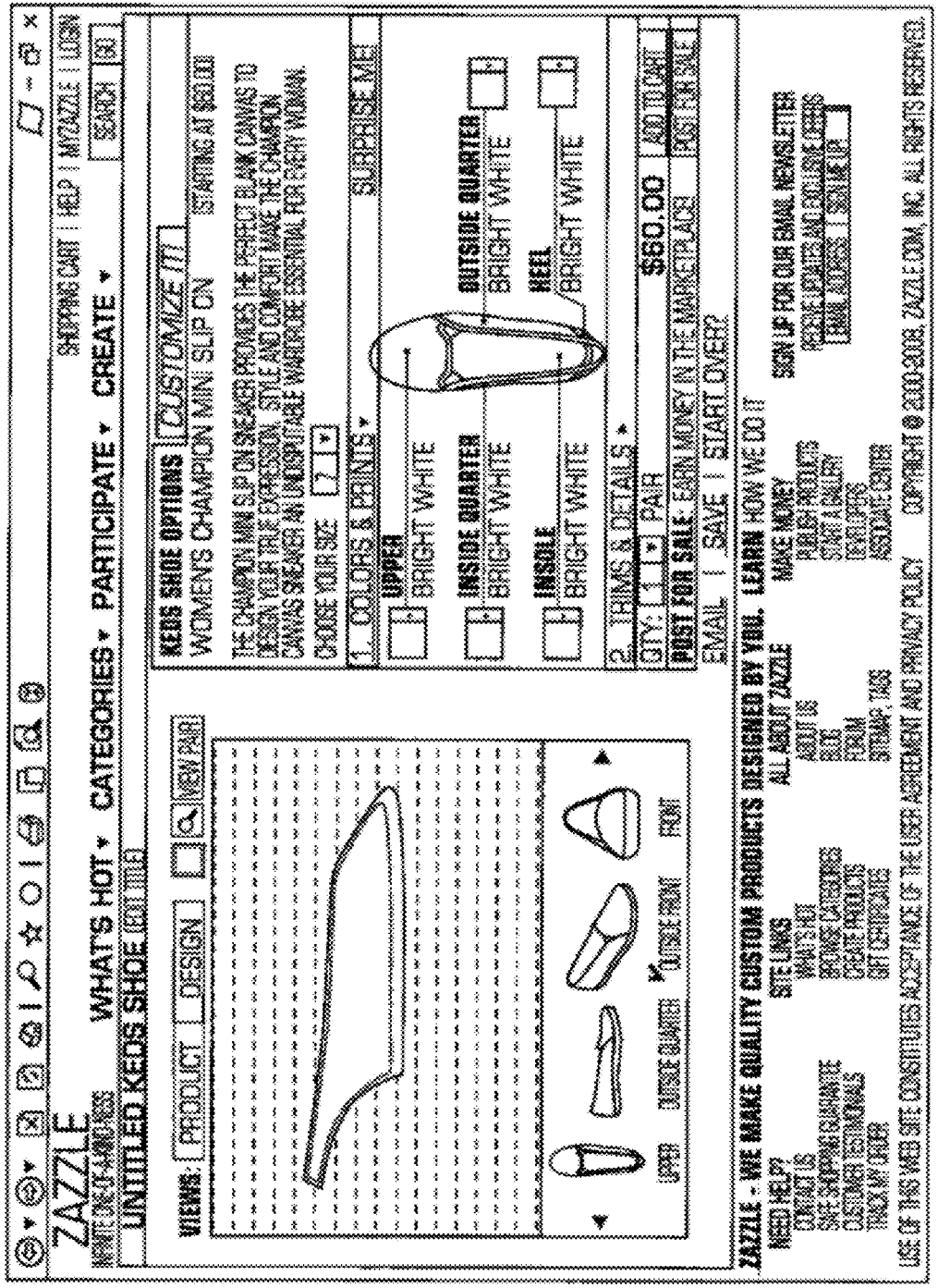
FIG. 5A illustrates an example of the design user interface of the product customization system.
Figure 5B:
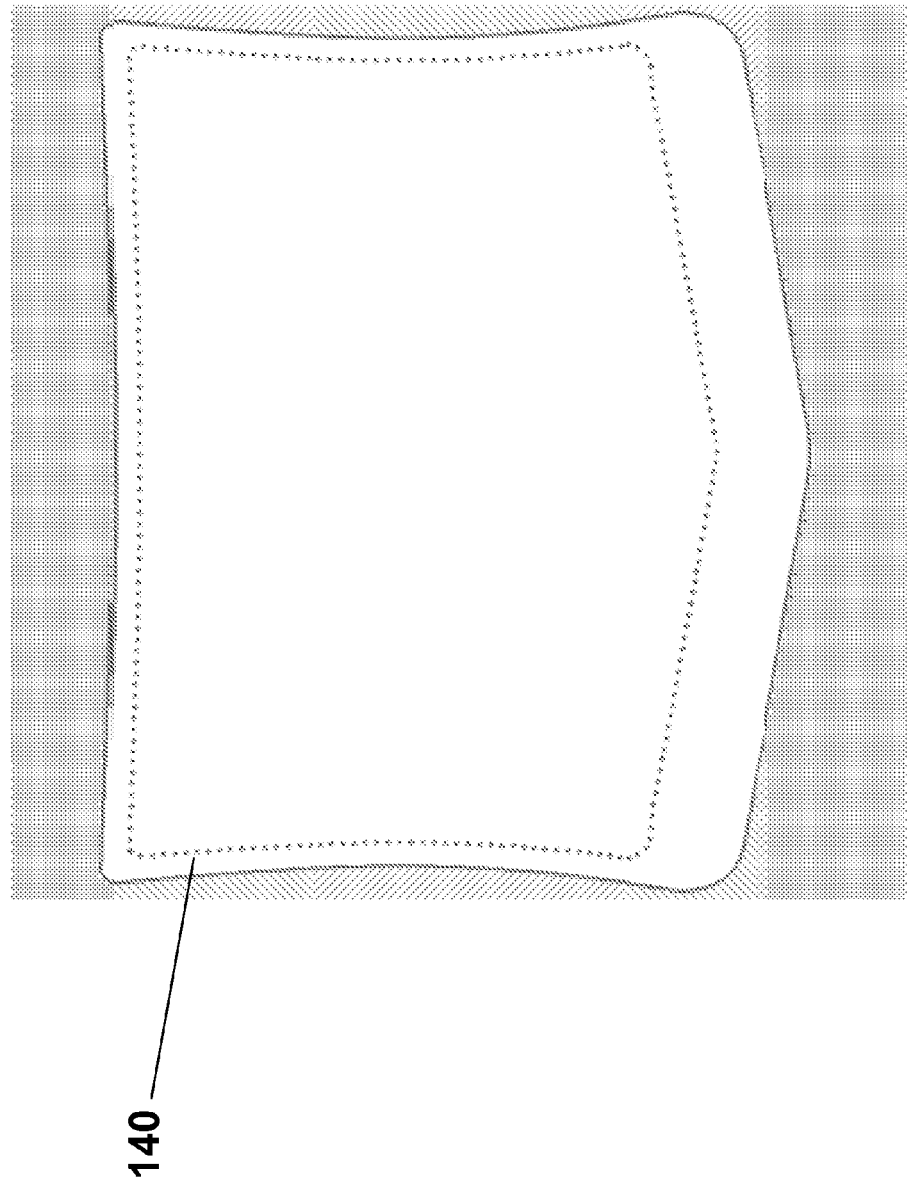
FIGS. 5B-5F illustrate examples of the images of the maximum and minimum design areas based on manufacturing tolerances that are part of the product customization system.
Figure 5C:
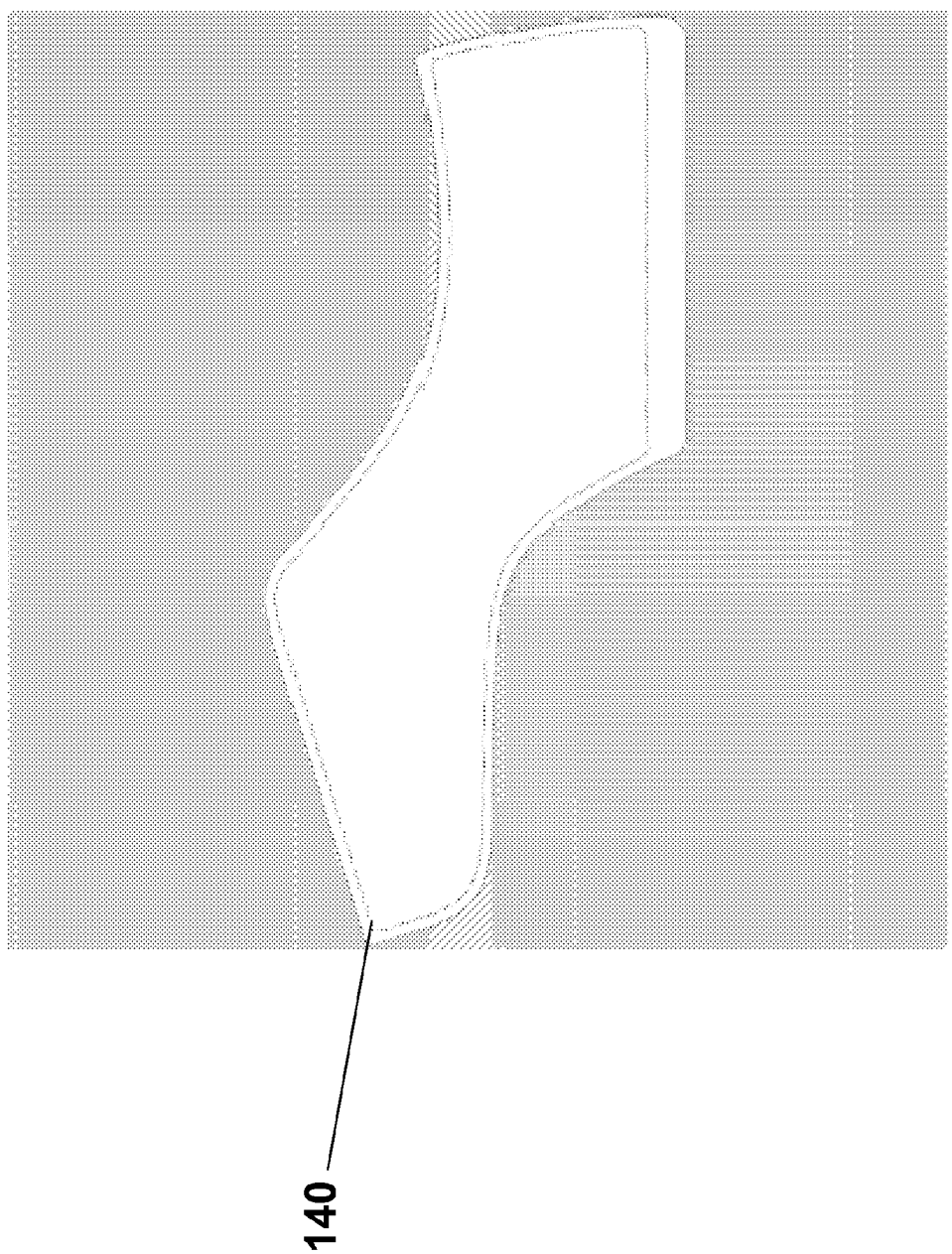
Figure 5D:
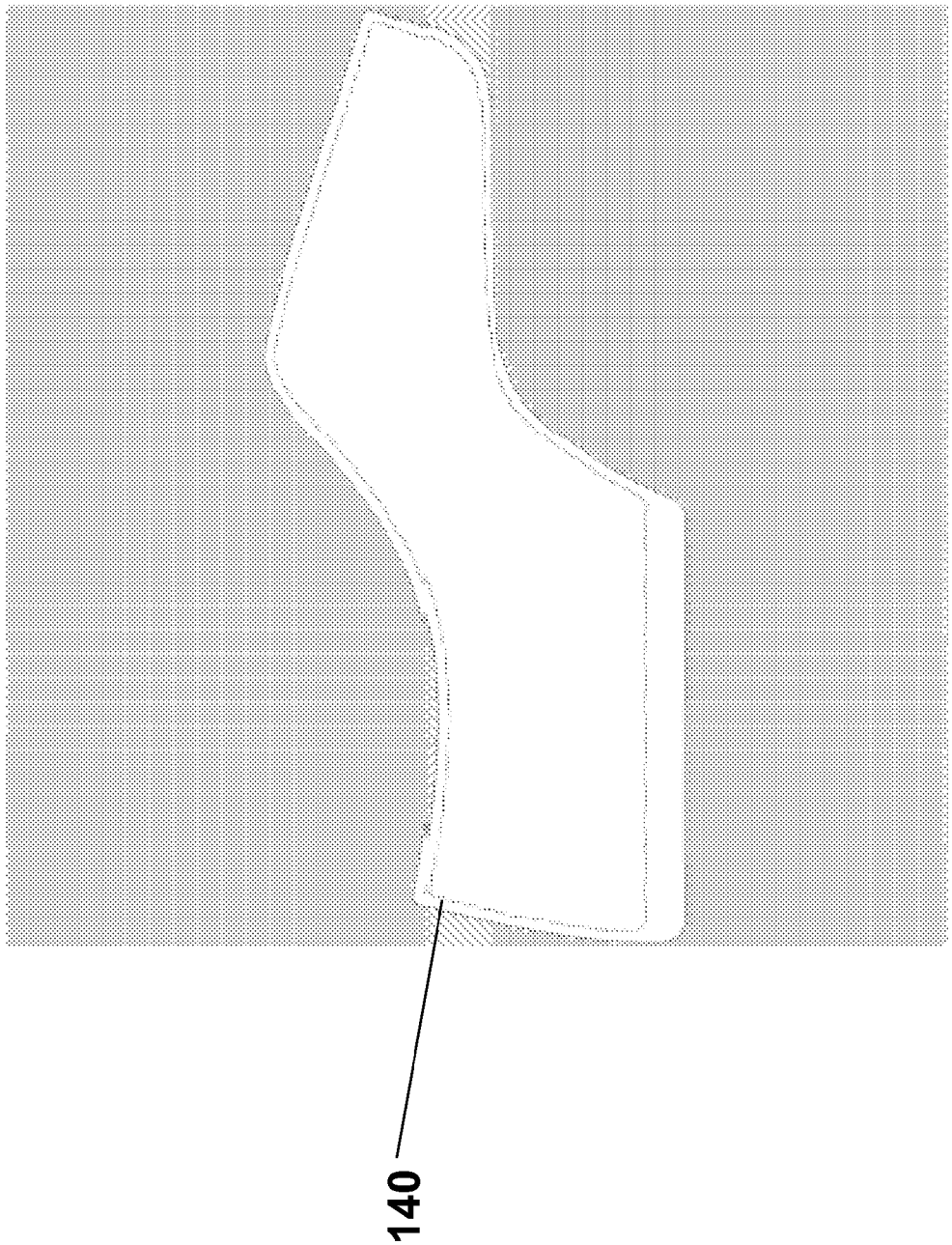
Figure 5E:
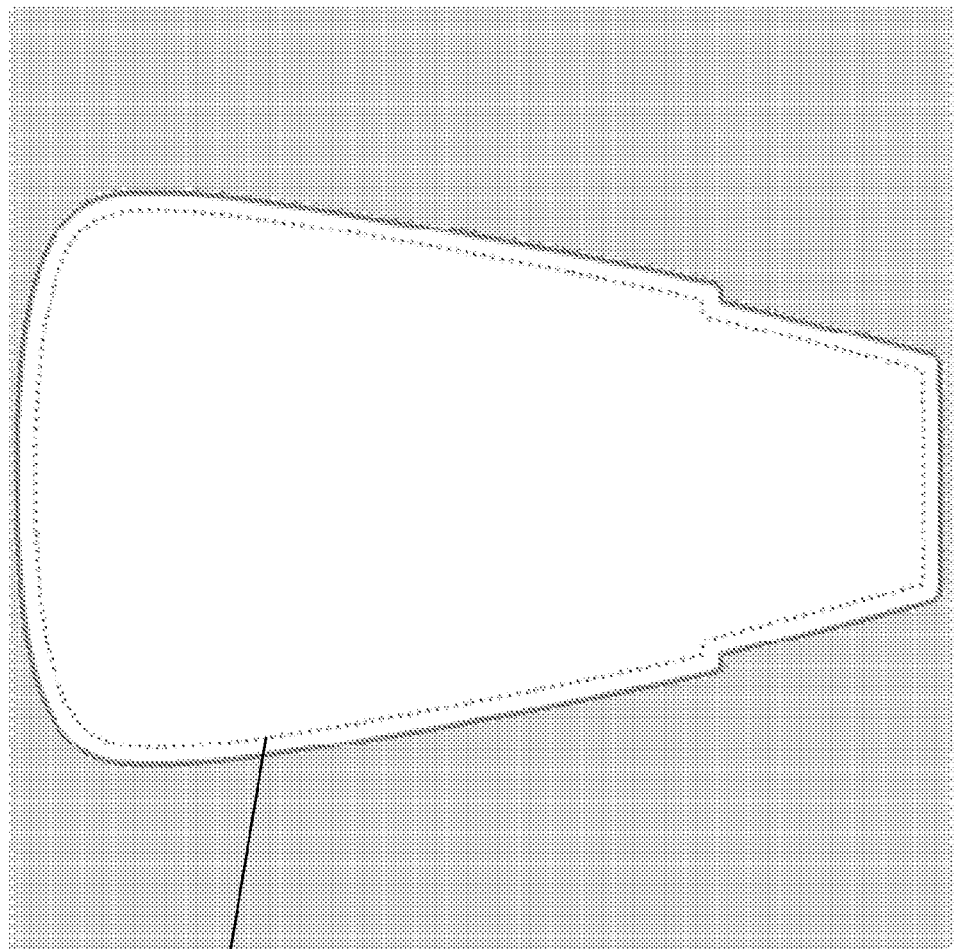
Figure 5F:
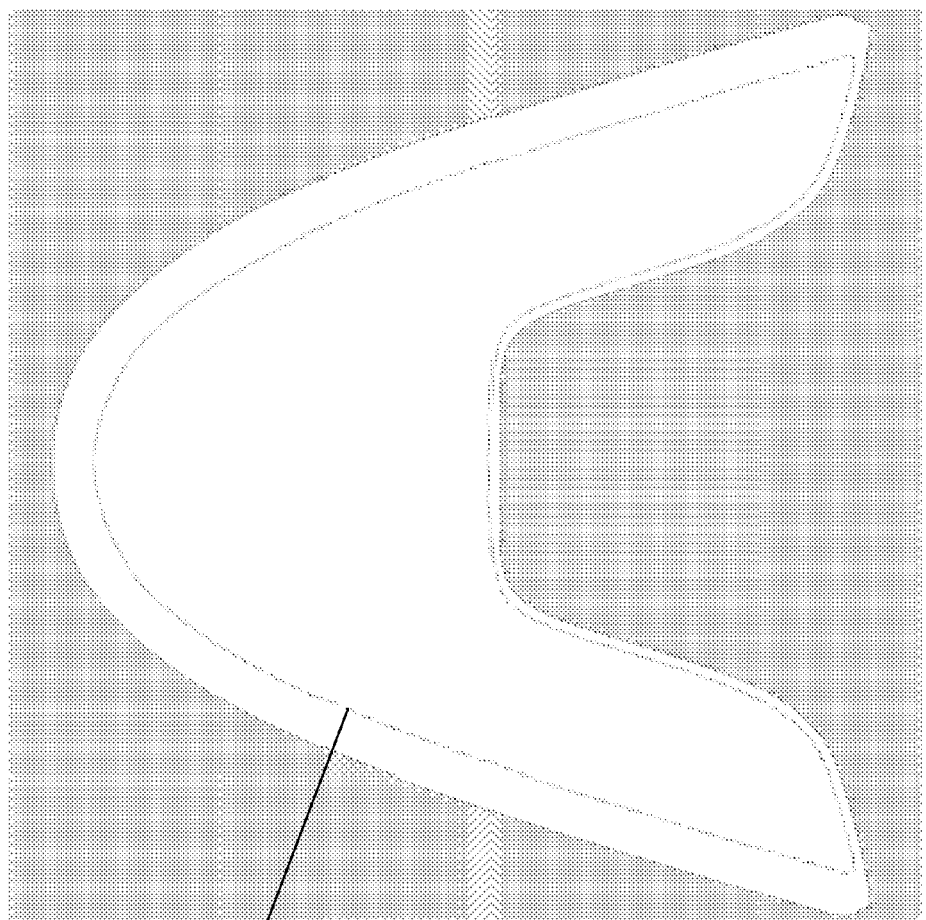
Figure 6:
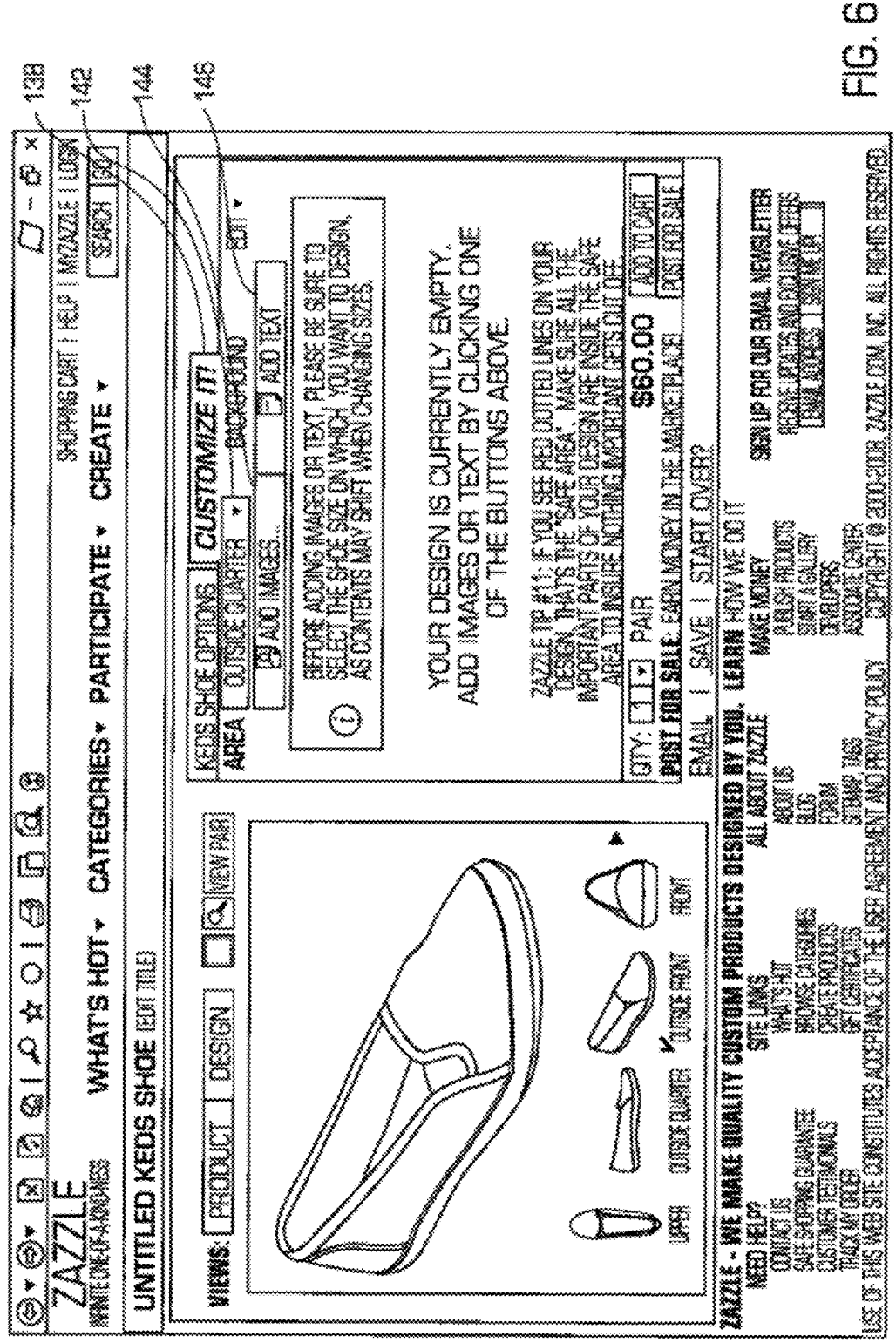
FIG. 6 illustrates an example of further details of the customize it user interface of the product customization system.

FIG. 5A illustrates an example of the design user interface of the product customization system that is shown when the user clicks on the design button of the view portion 132. The design user interface allows the user to view each design area of the product (the blank of an outside front of a shoe is shown in FIG. 5A. In the design user interface, each design area of the product may be selected using the selection portion of the user interface at the bottom.

The user interface, as shown in FIGS. 5A-5F for each of the design areas of a shoe, also displays a maximum and minimum design areas of the particular product being customized. A boundary 140 into which any design must be fit is shown on each design area of the product. This ensures that any user content placed on the product will be viewable once the product is assembled. For example, the boundary 140 ensures that part of the user content is not covered up by another part of the shoe. The boundary area 140 may also ensure that there is not an unwanted boundary area around a design area so that, for example, a black color design area does not have a white boundary which is not what was designed by the user/consumer.

Figure 7:
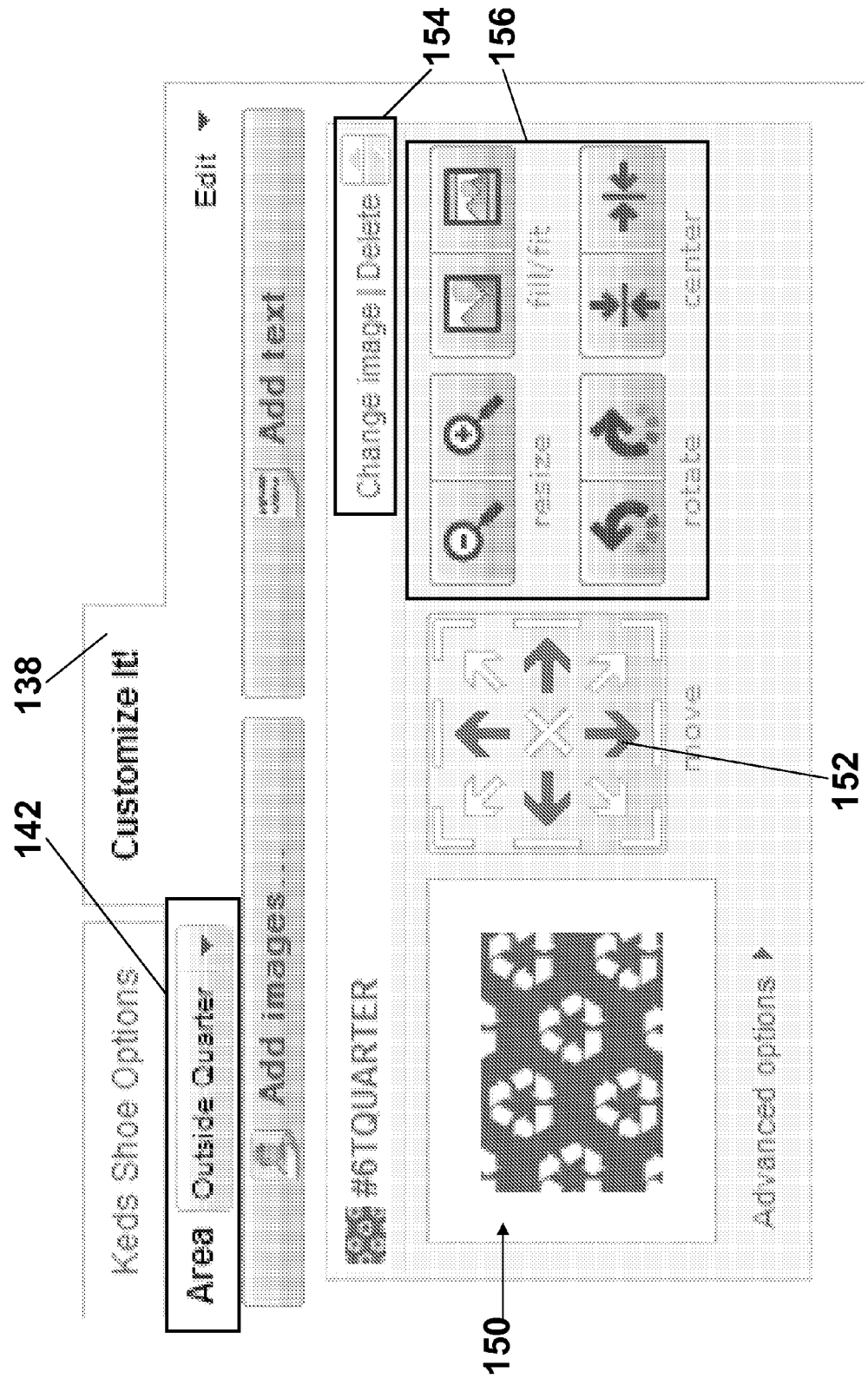
FIG. 7 illustrates a product customization user interface of the product customization system.
Figure 8:
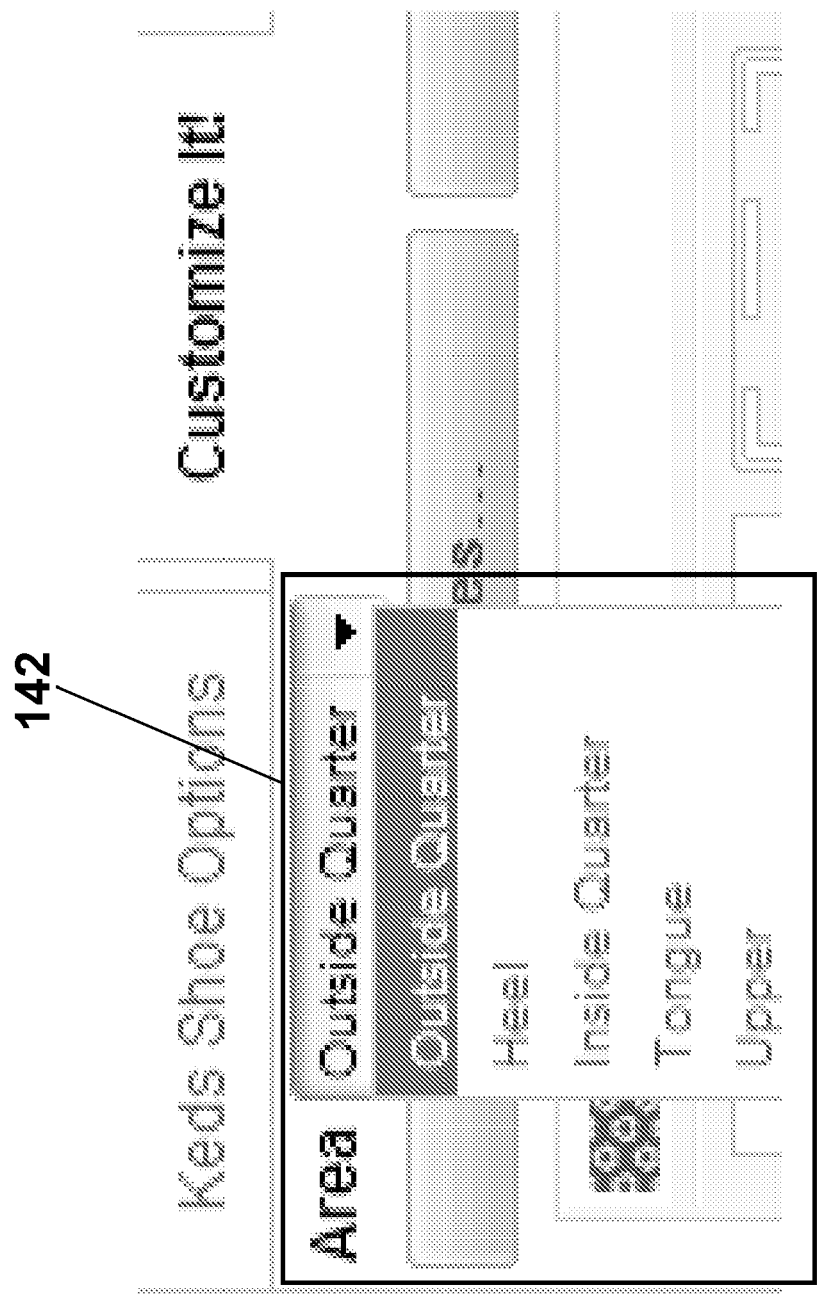
FIG. 8 illustrates further details of the product customization user interface of the product customization system.

FIG. 6 illustrates an example of further details of user interface of the product customization system. As shown, for each design area of the product (selected by a drop down menu 142 shown in more detail in FIG. 8), the user/consumer may add images using an add images portion 144 (shown in FIG. 7 in more detail) and/or add text using an add text portion 146 (shown in more detail in FIG. 13). As shown in FIG. 7, the add images portion 144 may further include a thumbnail of a selected image 150 (selected using the interface as shown in FIG. 9), a tool to move the design 152 around the design area, a tool 154 to change an image or delete an image and tools 156 to resize the image, fill/fit the image, rotate the image and/or center the image.

Figure 9:
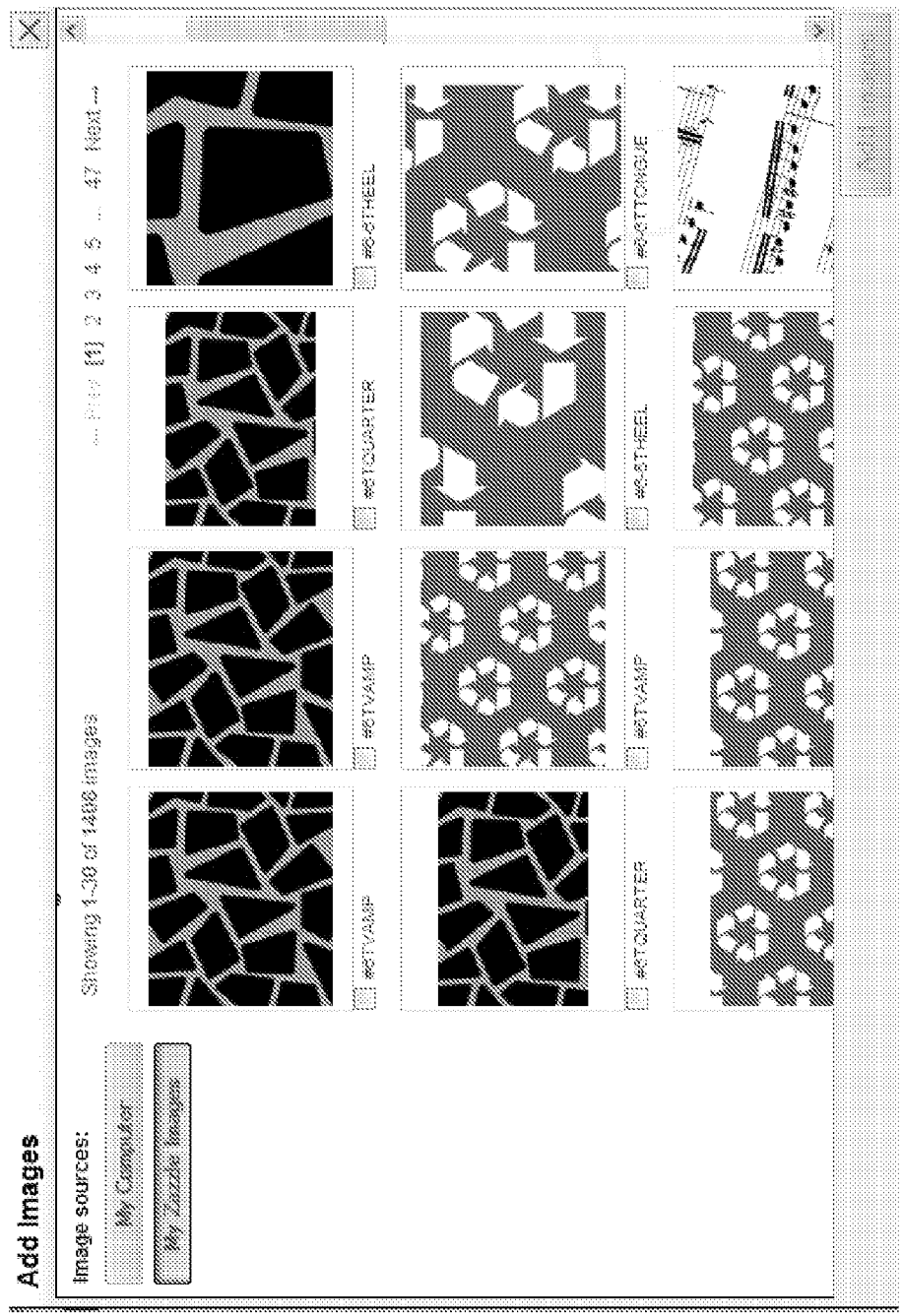
FIG. 9 illustrates an image selection user interface of the product customization system.

FIG. 9 illustrates an image selection user interface of the product customization system. The user interface allows the user to upload images from a computer or from a MyZazzle folder. The user interface allows the user to upload as many images as the user wants. When the user is done selecting images, the user can click the Add Images button to upload the images to the product.

Figure 10:
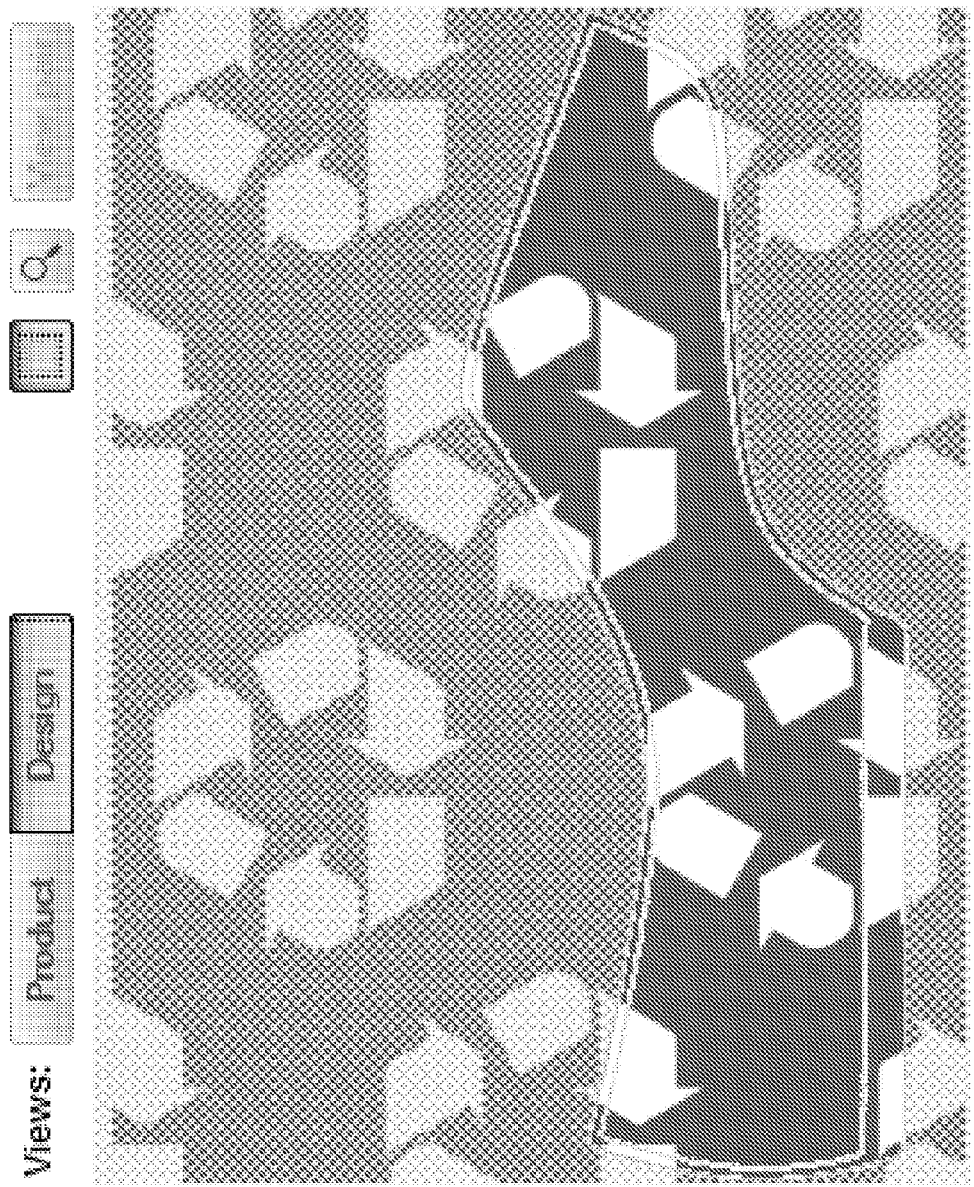
FIG. 10 illustrates a customized product design user interface of the product customization system.

FIG. 10 illustrates a customized product design user interface of the product customization system. This portion of the user interface allows the user to reposition the image by clicking and dragging in the design view portion as shown. This option is useful for exact positioning of the image within each design area of the product.

Figure 11:
FIG. 11 illustrates a product design user interface of the product customization system.

FIG. 11 illustrates a product design user interface of the product customization system. In this view, the user can see each design area of the product with the selected user content as shown. The user may also rotate among the design areas of the product using the selector at the bottom of the user interface. FIGS. 12A and 12B illustrate two customized product preview user interface of the product customization system wherein FIG. 12A displays an image of the completed customized shoe (generated by the user product renderer) and FIG. 12B shows the pair of shoes with the user content.

Figure 13:
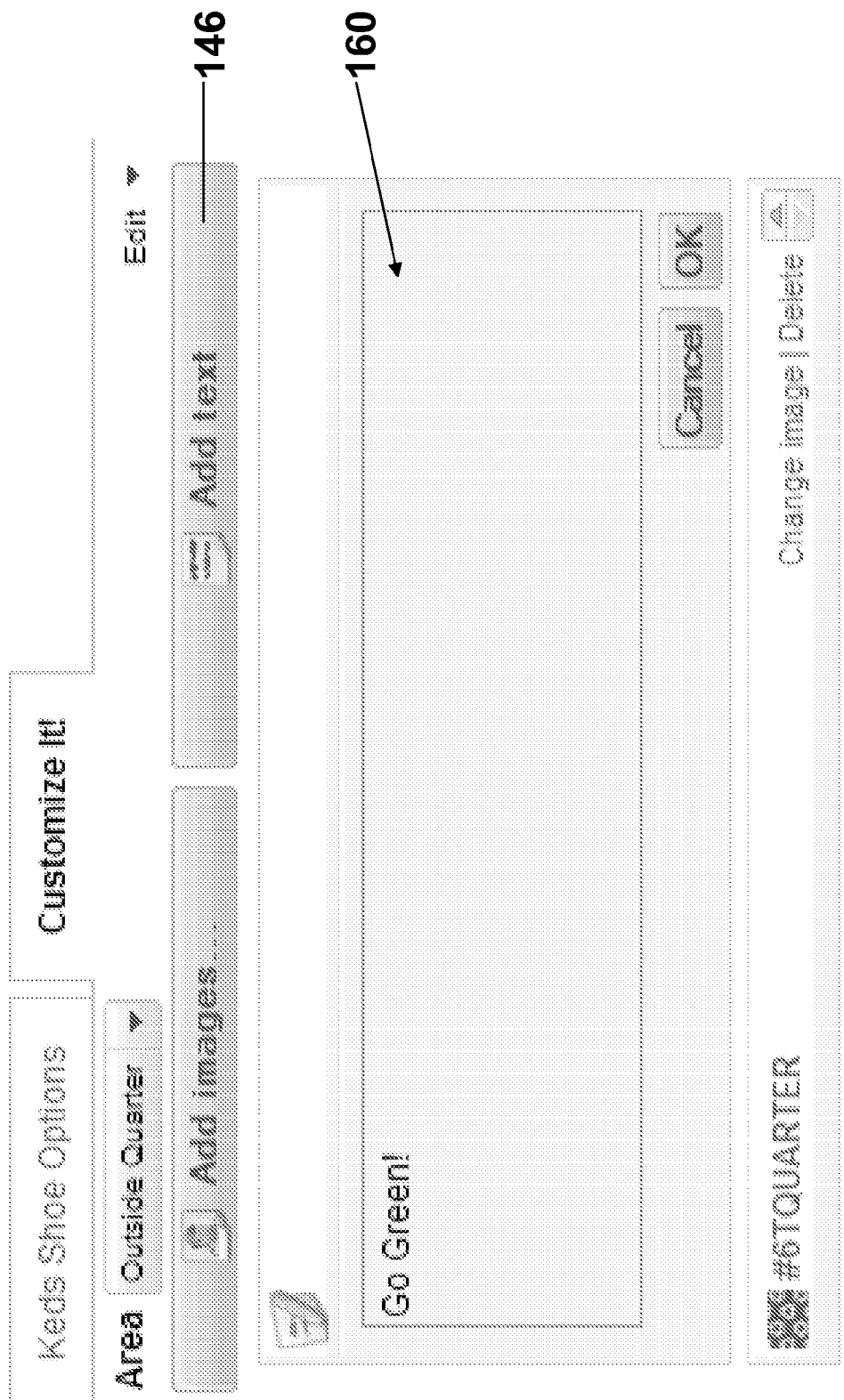
FIG. 13 illustrates an add text user interface of the product customization system.

FIG. 13 illustrates an add text user interface 146 of the product customization system. This user interface allows the user to insert text using a text interface 160 onto the product. As with the images, the user interface allows the user/consumer to specify the location of the text and which ones of the design areas on which the text appears.

Figure 14:
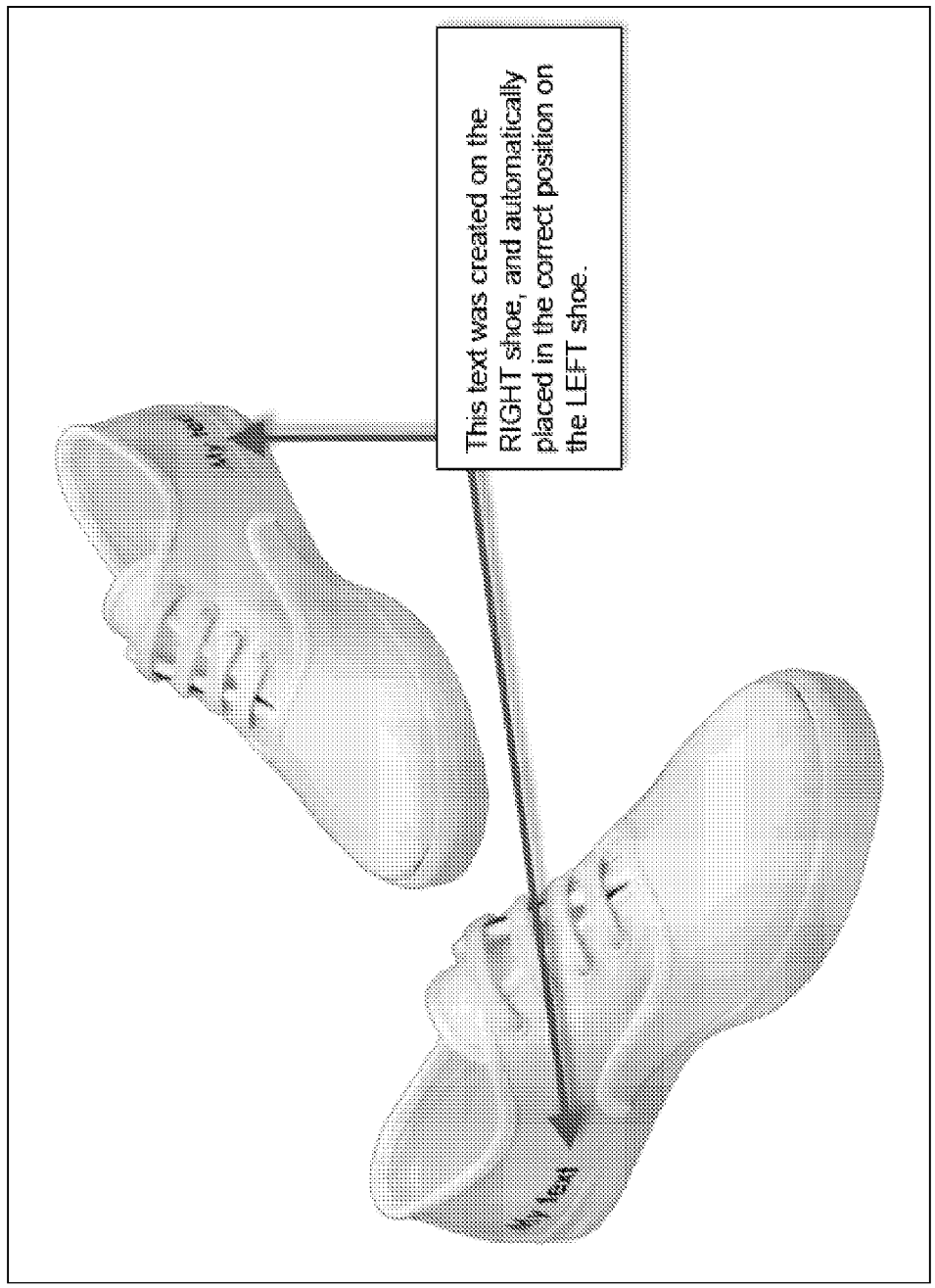
FIG. 14 illustrates a customized product text preview user interface of the product customization system.

FIG. 14 illustrates a customized product text preview user interface of the product customization system that involves mirroring. In particular, the system allows the user to design a first portion of a product, such as a right shoe, and then correctly mirrors the user content onto a second portion of the product, such as the left shoe, wherein the left shoe will automatically be created with all the same design elements in the correct places. For example, all images will be "mirrored" onto the left shoe, meaning they will appear in reverse, as if looking at the images in a mirror. As another example, text (as shown in FIG. 14) is properly mirrored as shown.

Figure 15:
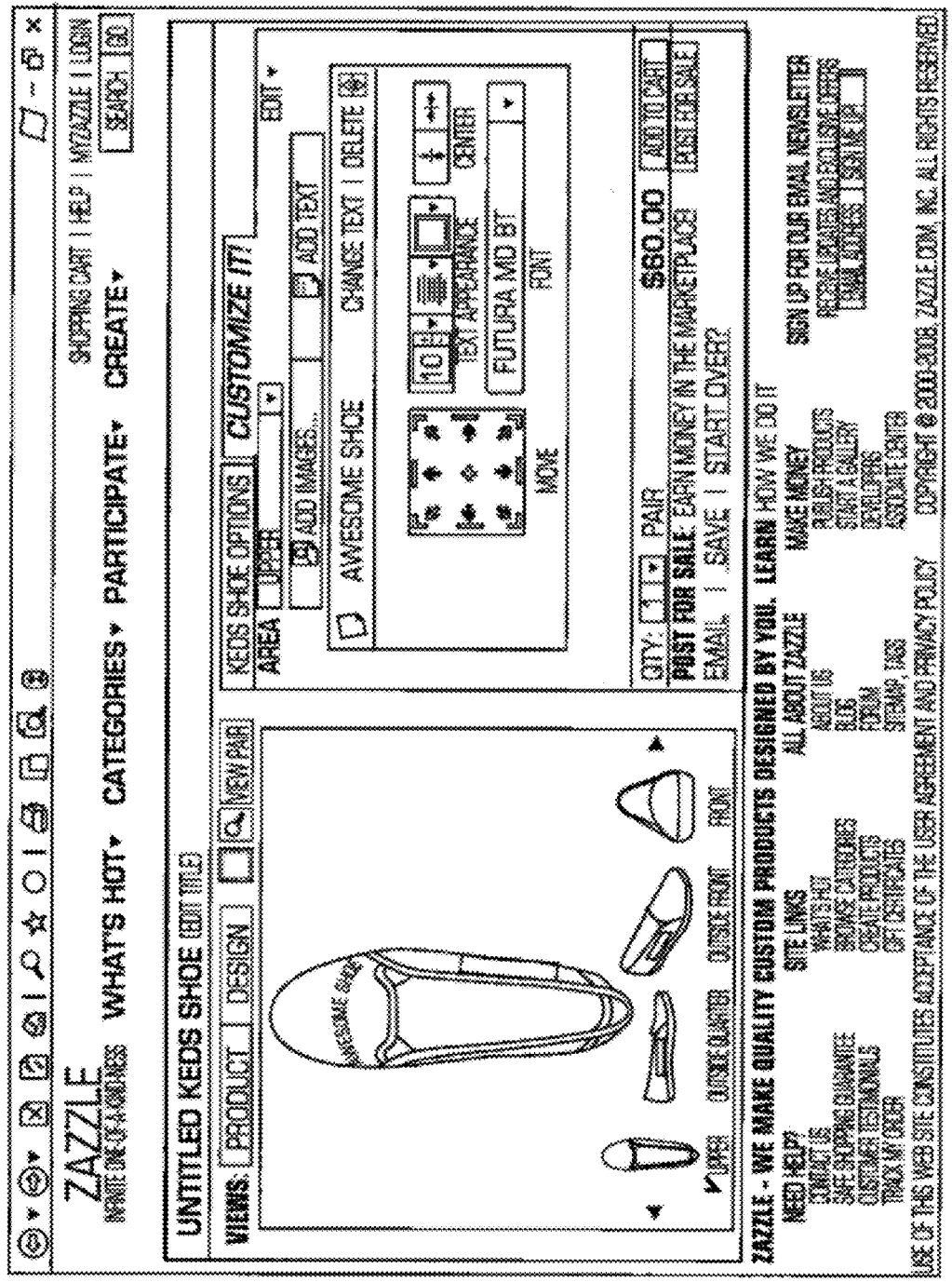
FIG. 15 illustrates another customized product preview user interface of the product customization system.

FIG. 15 illustrates another customized product preview user interface of the product customization system. As shown in FIG. 15, a completed customized shoe is shown that has text on an upper design area of the shoe and then an image on an outside quarter design area of the shoe. The image of the completed customized shoe is generate by the user product renderer allows the user to view the customized shoe before submitting an order. Now, the manufacturing portion of the product customization system is described in more detail.

The manufacturing portion of the system may include material preparing processes that may include processes for inspection and cutting of fabric, pre-treating the material with liquid, choosing a brand of fabric and selecting the printer and inks for printing on the material. Each of these processes for preparing the material will now be described in more detail.

Figure 16A:
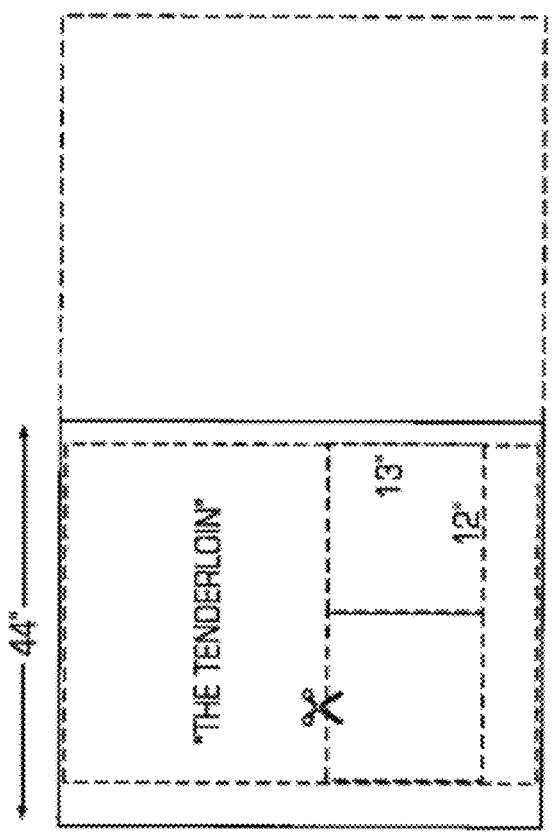
FIGS. 16A and 16B illustrate a material preview method of the product customization system.
Figure 16B:
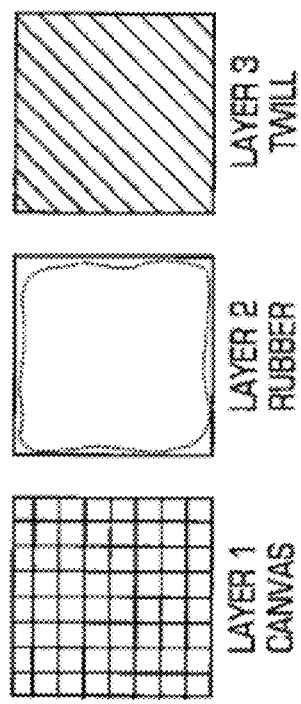
Figure 17:
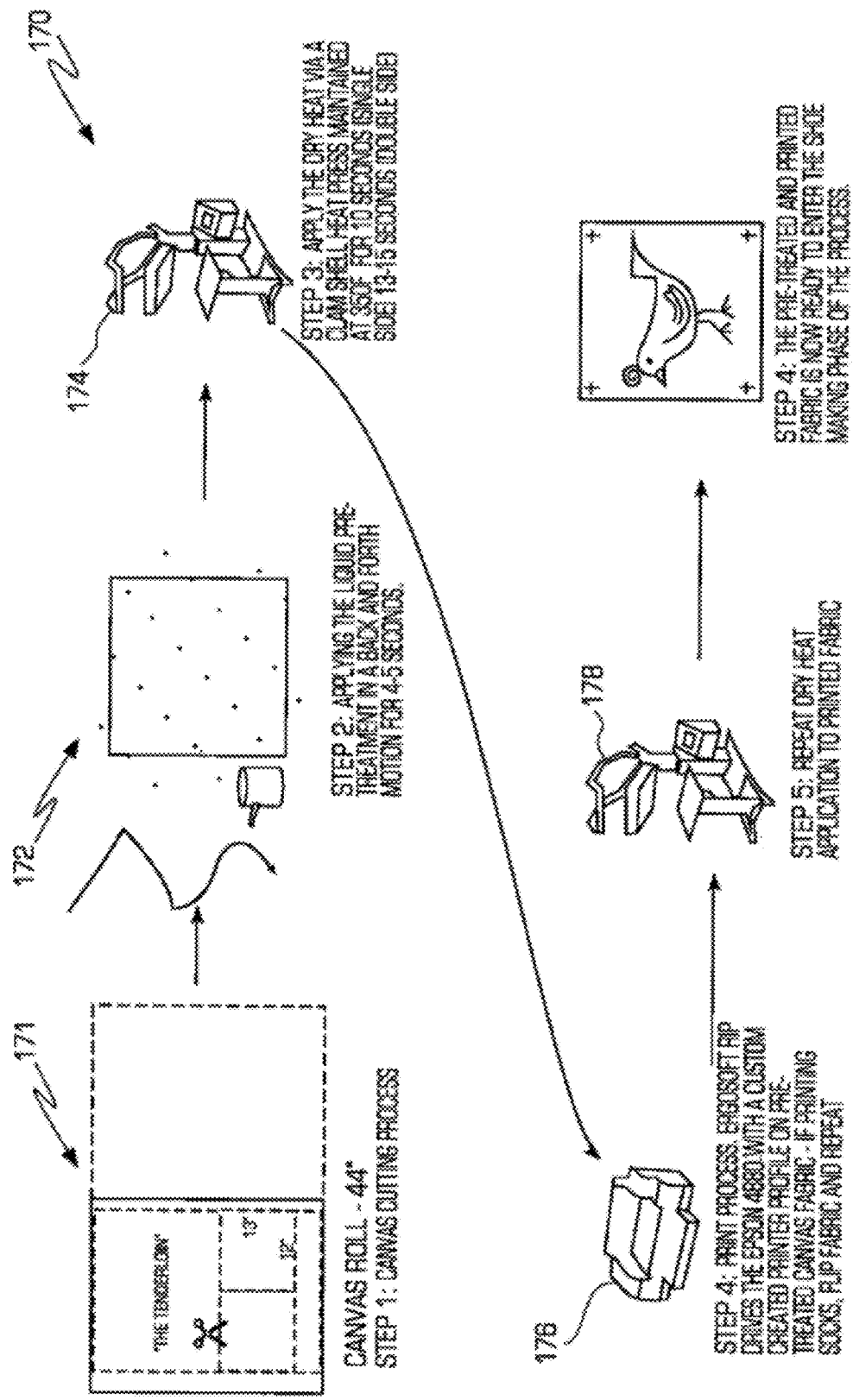
FIG. 17 illustrates more details of the material preview method of the product customization system.

FIGS. 16A and 16B illustrate a material preview method of the product customization system and FIG. 17 illustrates more details of the material preview method 170 of the product customization system.

Inspecting and Cutting of Fabric (171)

Pre-inspection for yellowing, presumably caused by water stains, is a fundamental step in the cutting process. Test samples may show that yards of fabric that are unusable upon initial inspection. Layers of the material being used are shown in FIG. 16B. Rolls of canvas (shown as scalloped in FIG. 16A) can lack sufficient adhesive to maintain layer stability during the post-print treatment. For example, some 44" wide rolls (as shown in FIG. 16A) required as much as 5" be cut from the edges in order to avoid separation. In order to avoid this instability, the manufacturing process may use 2 17" square pieces of canvas cut from material as shown in FIG. 16A.

Pre-Treatment: Application (172)

The pre-treating process of the base fabric allows for consistent adhesion, color brilliance and washability of products created using the fabric. In general terms, liquid pre-treatment may consist of a fatty acid, some form of glycol base, salt and water. The pre-treatment process may consist of applying a liquid spray to clean, dry 3-ply canvas material. Once the front has been sprayed, the fabric is reversed (with the twill side is exposed), and the same process as applied on side 1 is repeated. Immediately after applying spray to both sides of the fabric, the flattened sheets are placed in a fabric press maintained at a suitable temperature (174). The fabric must be positioned flat as to not cause a crease. Pressure may be applied to the fabric for a suitable time period at a suitable temperature and then allowed to return to room temperature.

The design is printed on the fabric substrate using methods that are in common commercial use. These processes are chosen, and the parametric attributes are tuned based on the production of reference product for the reflectance portion of the system.

For the printing (176), Software is used to apply color and placement calibration from the reflectance portion of the system to the printed designs to allow the product to match the image shown to the user at time of purchase. This calibration includes both the transformation of the color and placement space to match the characteristics of the finished product. Once the fabric is printed, heat is again applied (178) to the printed fabric. The heat is applied in a consistent manner that cures the ink, and subsequently causes changes in the ink and fabric color. Additionally, the product may be 'vulcanized' or subjected to heat, pressure, and/or chemical processes which change product color and dimensions. Consistent application of these processes is necessary for the production product to match the processing of the reference product in order to maintain color and design position and scale of the production product. Reference product is processed at regular intervals to update color and placement calibration by the reflectance portion of the system.

Once the process of preparing the fabric, printing the user content and post-processing of the printed fabric is completed, the fabric may be cut and used to make the product, such as the customized shoes using a well known shoe making process.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer implemented system for designing and producing a customized product, comprising:
   a computer having a memory;
   a product renderer portion, executed by the computer, that generates a visual three dimensional representation of a finished product using one or more two dimensional design areas of the product with the user content rendered in three dimensions and the visual three dimensional representation of a finished product with the user content is displayed using the user interface portion, wherein the product renderer portion also generates a product description based on the one or more design areas of the product with the user content;
   a manufacturing product rendering portion, executed by the computer, that, based on the product description, generates one or more manufacturing files including a layout of the one or more design areas with user content of the product, a cutting of the one or more design areas with user content of the product and a set of assembly instructions for the one or more design areas with user content of the product; and
   a manufacture portion that prints the user content on a piece of material; that cuts the piece of material into the one or more design areas of the product and that assembles the one or more design areas of the product into an assembled customized product.

2. The system of claim 1 further comprising a user interface portion that allows the user to choose product attributes.

3. The system of claim 2, wherein the product attributes are one of trim color and accessories.

4. The system of claim 3, wherein the product renderer portion provides a rendering of user selected trim colors and accessories.

5. The system of claim 4, wherein the manufacture portion constructs the product with the trim colors provided in the product description, and adds or assembles accessories provided in the product description.

6. A method for designing and producing a customized product, the method comprising:
   generating, using a product renderer portion of the computer-based customized product unit, a visual three dimensional representation of a finished product using the one or more two dimensional design areas of the product with the user content rendered in three dimensions and the visual three dimensional representation of a finished product with the user content is displayed using the user interface portion;

generating, using the product renderer portion of the computer-based customized product unit, a product description based on the one or more design areas of the product with the user content;

generating, using a manufacturing product rendering portion of the computer-based customized product unit, one or more manufacturing files including a layout of the one or more design areas with user content of the product, a cutting of the one or more design areas with user content of the product and a set of assembly instructions for the one or more design areas with user content of the product based on the product description; and manufacturing, using a manufacture portion of the computer-based customized product unit, the product wherein the manufacturing further comprising printing the user content on a piece of material; cutting the piece of material into the one or more design areas of the product and assembling the one or more design areas of the product into an assembled customized product.

7. The method of claim 6 further comprising generating, using a user interface portion of a computer-based customized product unit, a user interface so that one or more two dimensional design areas of a product are created with user content that comprises one or more of a color, a tiled image, a photograph and a user designed image.

8. The method of claim 7, wherein the user interface portion allows the user to choose product attributes.

9. The method of claim 8, wherein the product attributes are one of trim color and accessories.

10. The method of claim 9 further comprising providing, by the product renderer portion, a rendering of user selected trim colors and accessories.

11. The method of claim 10 further comprising constructing, by the manufacture portion, the product with the trim colors provided in the product description, and adds or assembles accessories provided in the product description.

* * * * *